(12) United States Patent
Kato et al.

(10) Patent No.: US 10,634,819 B2
(45) Date of Patent: Apr. 28, 2020

(54) RESIN COMPOSITION, AND OPTICAL LENS, SHEET AND FILM WHICH CONTAIN SAME

(71) Applicant: MITSUBISHI GAS CHEMICAL COMPANY, INC., Tokyo (JP)

(72) Inventors: Noriyuki Kato, Tokyo (JP); Mitsuteru Kondo, Tokyo (JP); Munenori Shiratake, Tokyo (JP); Kentaro Ishihara, Tokyo (JP); Koji Hirose, Tokyo (JP); Shinya Ikeda, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 63 days.

(21) Appl. No.: 15/770,888

(22) PCT Filed: Nov. 2, 2016

(86) PCT No.: PCT/JP2016/082609
§ 371 (c)(1),
(2) Date: Apr. 25, 2018

(87) PCT Pub. No.: WO2017/078070
PCT Pub. Date: May 11, 2017

(65) Prior Publication Data
US 2018/0306948 A1   Oct. 25, 2018

(30) Foreign Application Priority Data

Nov. 4, 2015   (JP) .................... 2015-216962

(51) Int. Cl.
| | | |
|---|---|---|
| C08K 5/02 | (2006.01) | |
| G02B 1/04 | (2006.01) | |
| C08L 69/00 | (2006.01) | |
| C08G 64/04 | (2006.01) | |
| C08G 64/30 | (2006.01) | |
| C08K 5/05 | (2006.01) | |
| C08L 71/08 | (2006.01) | |

(52) U.S. Cl.
CPC ............ *G02B 1/041* (2013.01); *C08G 64/04* (2013.01); *C08G 64/045* (2013.01); *C08G 64/307* (2013.01); *C08K 5/02* (2013.01); *C08K 5/05* (2013.01); *C08L 69/00* (2013.01); *C08L 71/08* (2013.01); *G02B 1/04* (2013.01); *C08L 2203/16* (2013.01)

(58) Field of Classification Search
USPC .................................................. 528/196, 198
See application file for complete search history.

(56) References Cited

U.S. PATENT DOCUMENTS

2015/0285954 A1   10/2015   Ishizuka et al.

FOREIGN PATENT DOCUMENTS

| | | |
|---|---|---|
| JP | 2008111047 | 5/2008 |
| JP | 2013-64119 | 4/2013 |
| JP | 2014-185325 | 10/2014 |
| JP | 2015-86265 | 5/2015 |
| WO | 2014/054710 | 4/2014 |
| WO | 2014/073496 | 5/2014 |

OTHER PUBLICATIONS

International Search Report issued in International Bureau of WIPO Patent Application No. PCT/JP2016/082609, dated Jan. 24, 2017.

*Primary Examiner* — Terressa Boykin
(74) *Attorney, Agent, or Firm* — Greenblum & Bernstein, P.L.C.

(57) ABSTRACT

Provided is a resin composition that exhibits excellent strength and fluidity. According to one embodiment, the provided resin composition contains a resin containing a repeating unit derived from a compound represented by general formula (1), and also contains a polymer having an end structure represented by general formula (A) and/or contains a compound represented by general formula (B).

20 Claims, 8 Drawing Sheets

[Figure 1a]
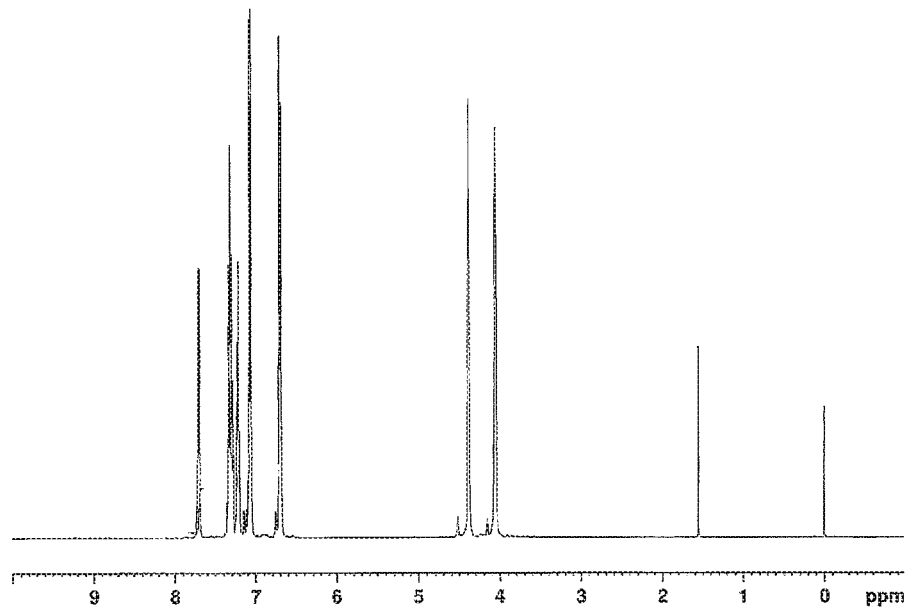
[Figure 1b]
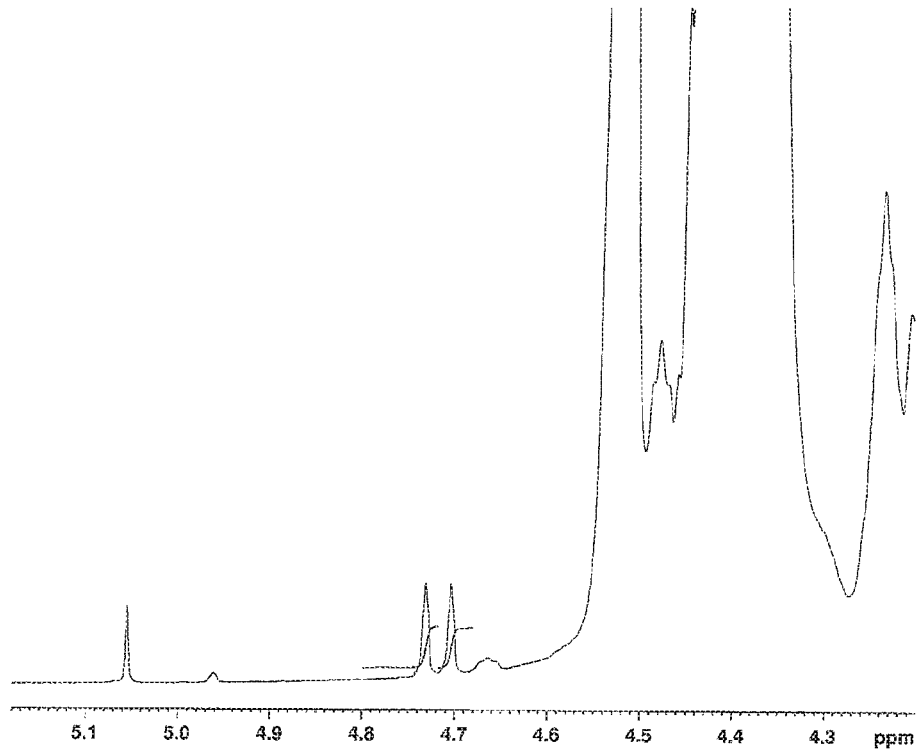

[Figure 1c]
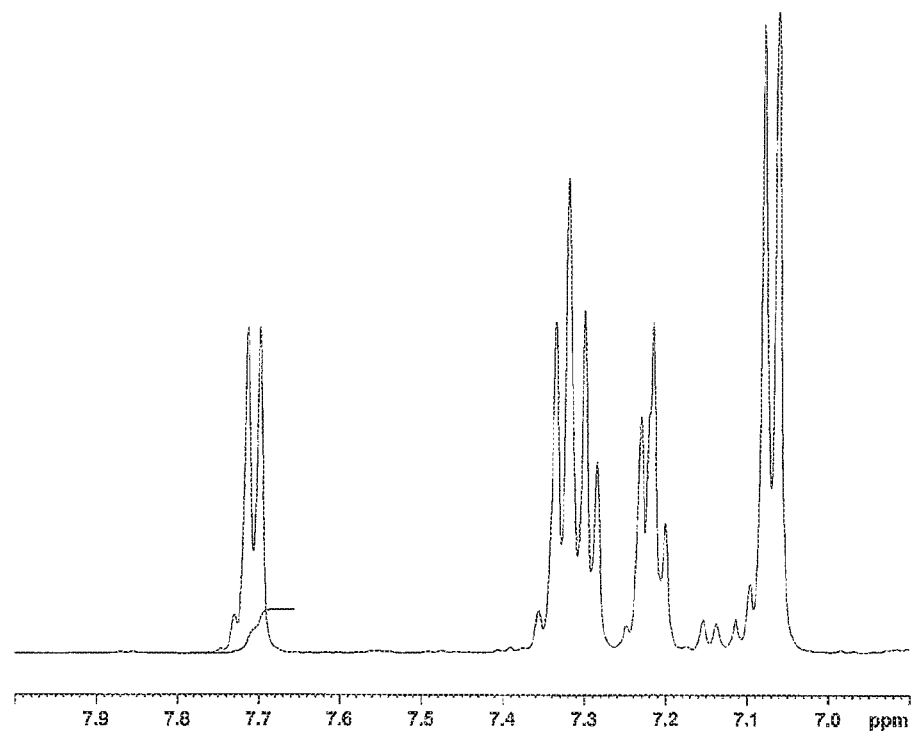

[Figure 2a]
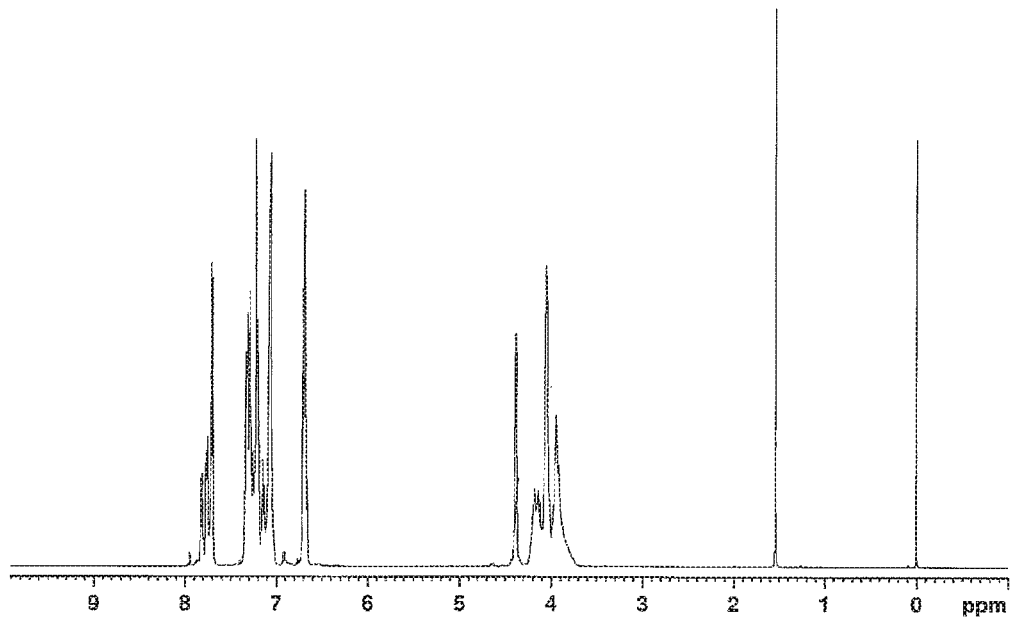
[Figure 2b]
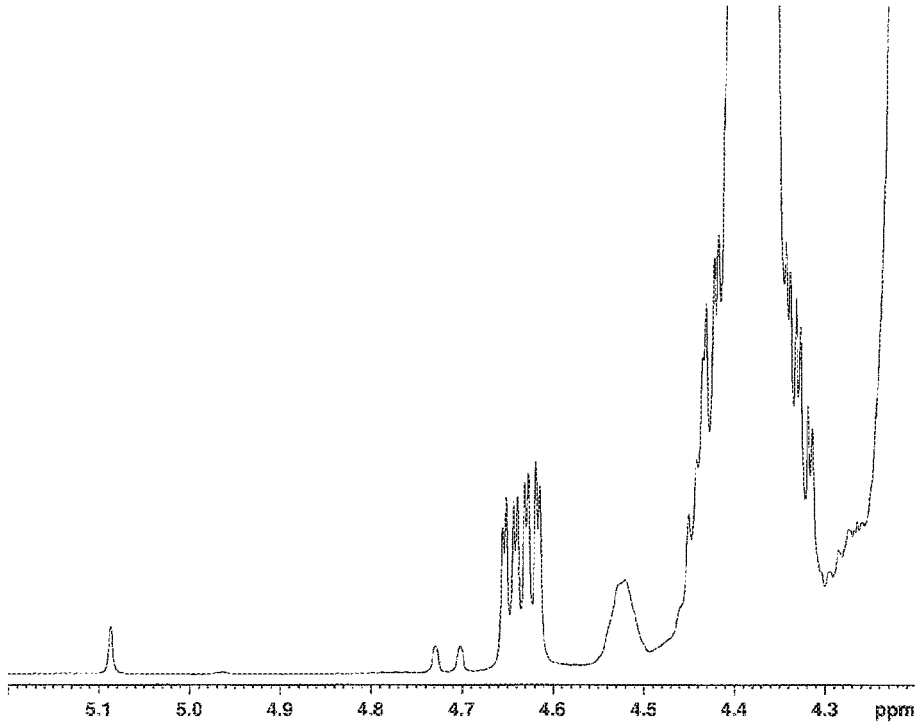

[Figure 3a]
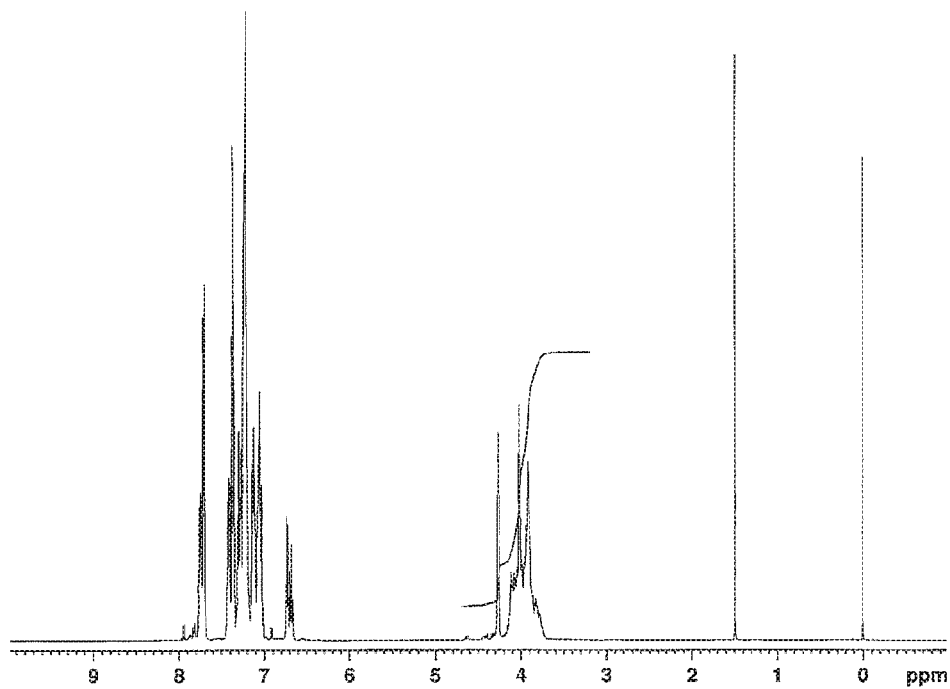
[Figure 3b]
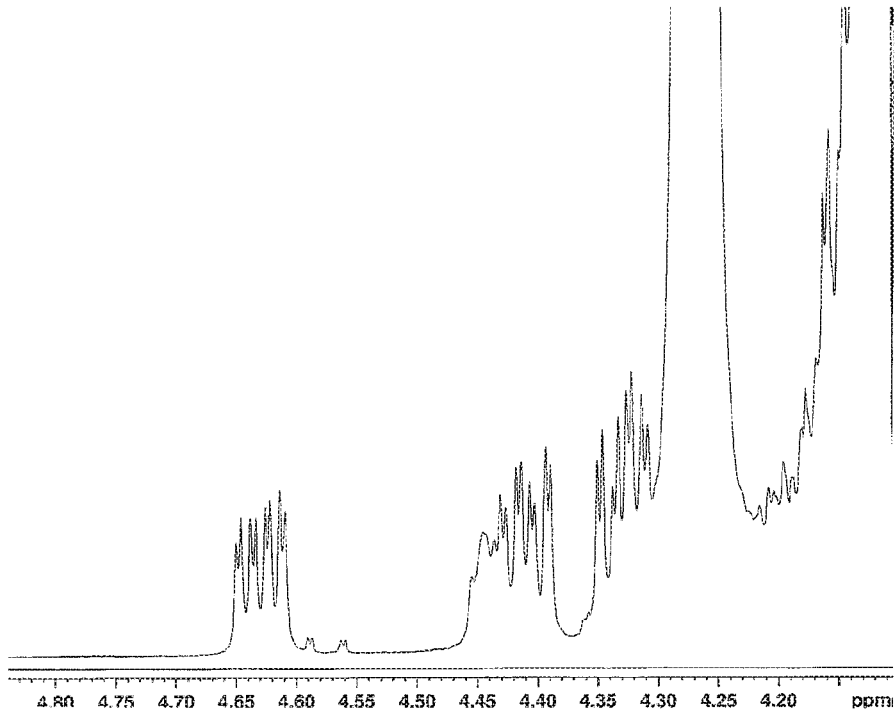

[Figure 4a]
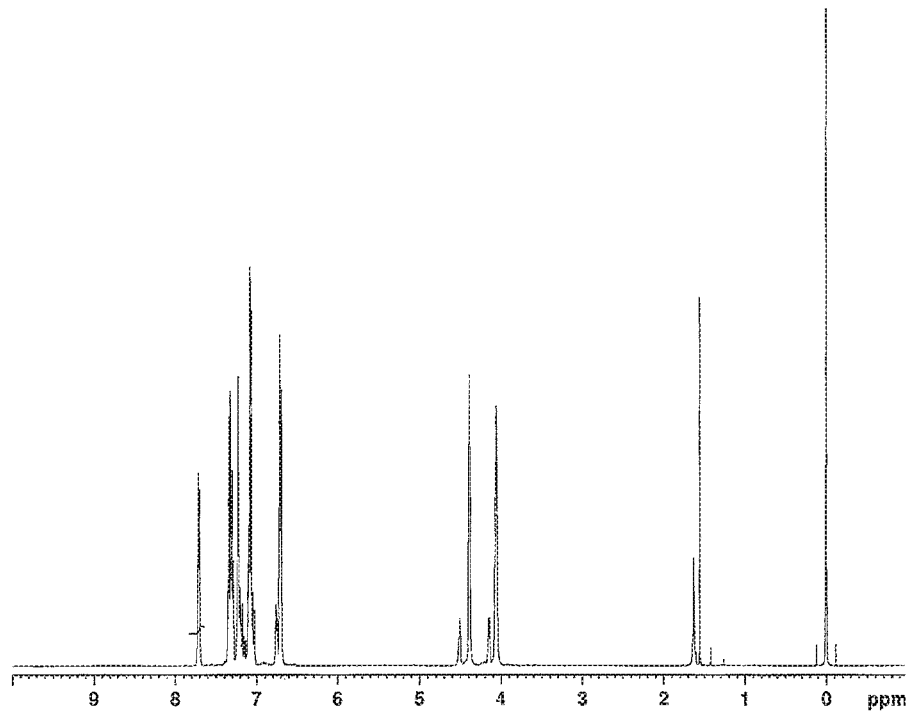
[Figure 4b]
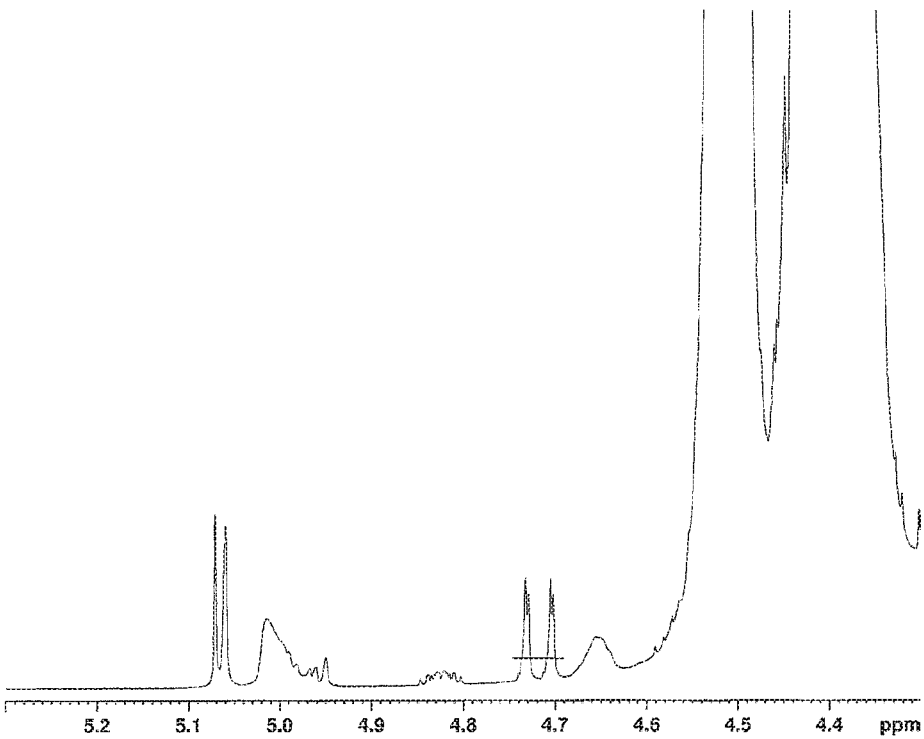

[Figure 5a]
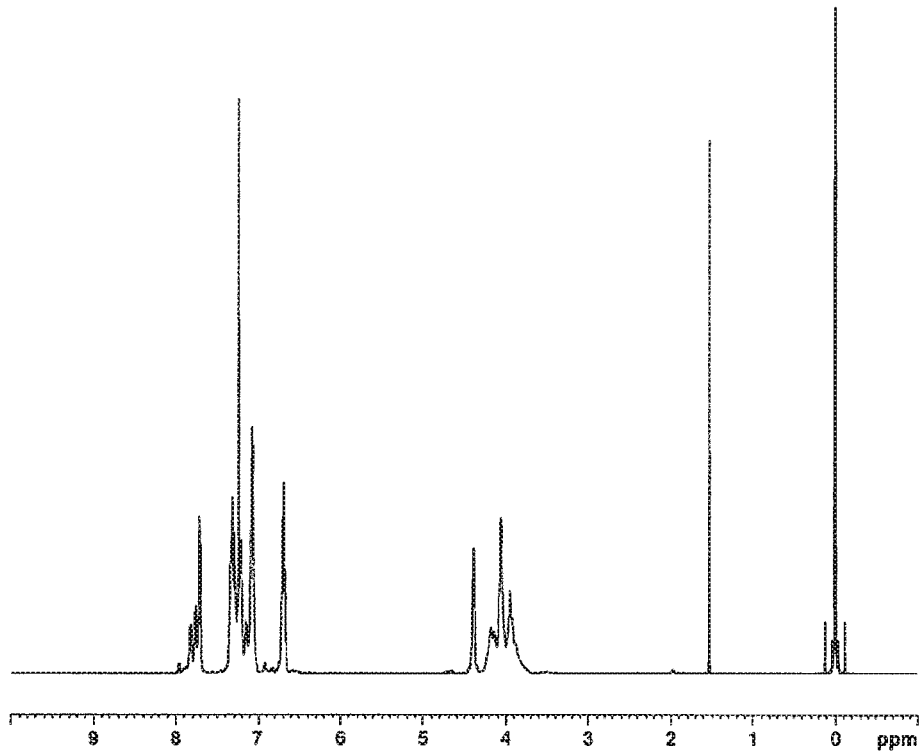
[Figure 5b]
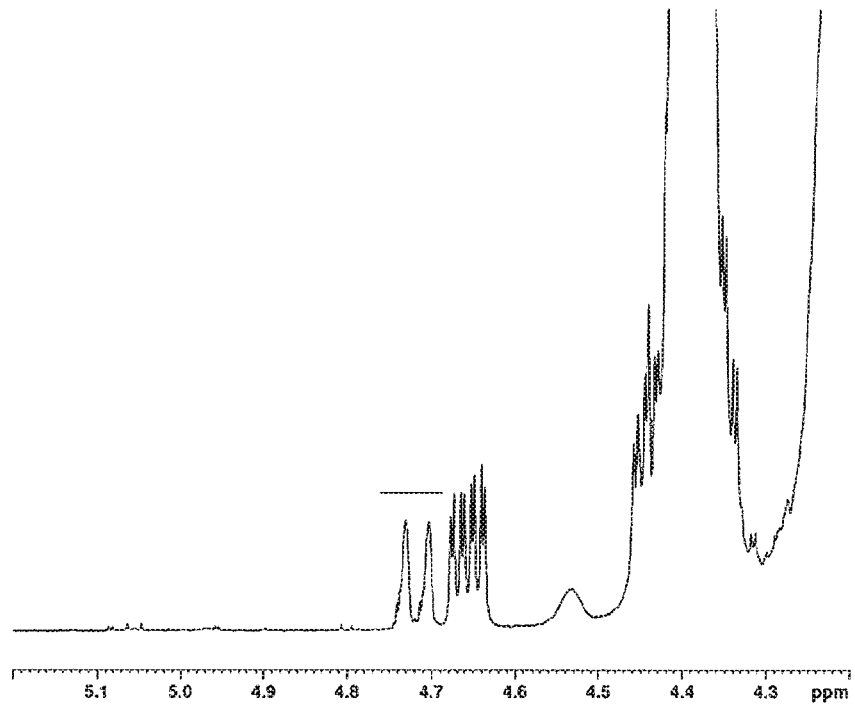

[Figure 6a]
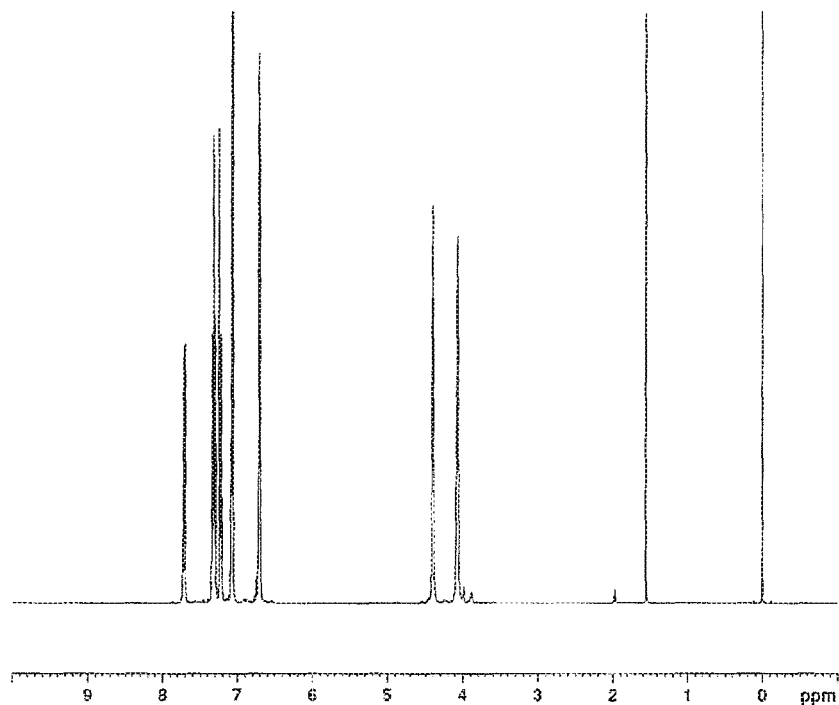
[Figure 6b]
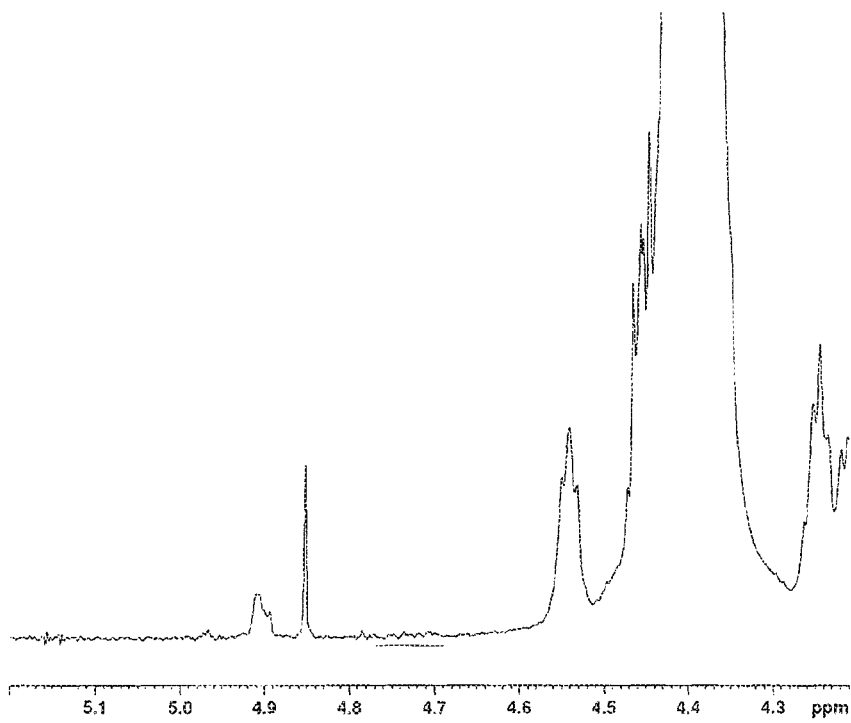

[Figure 7a]
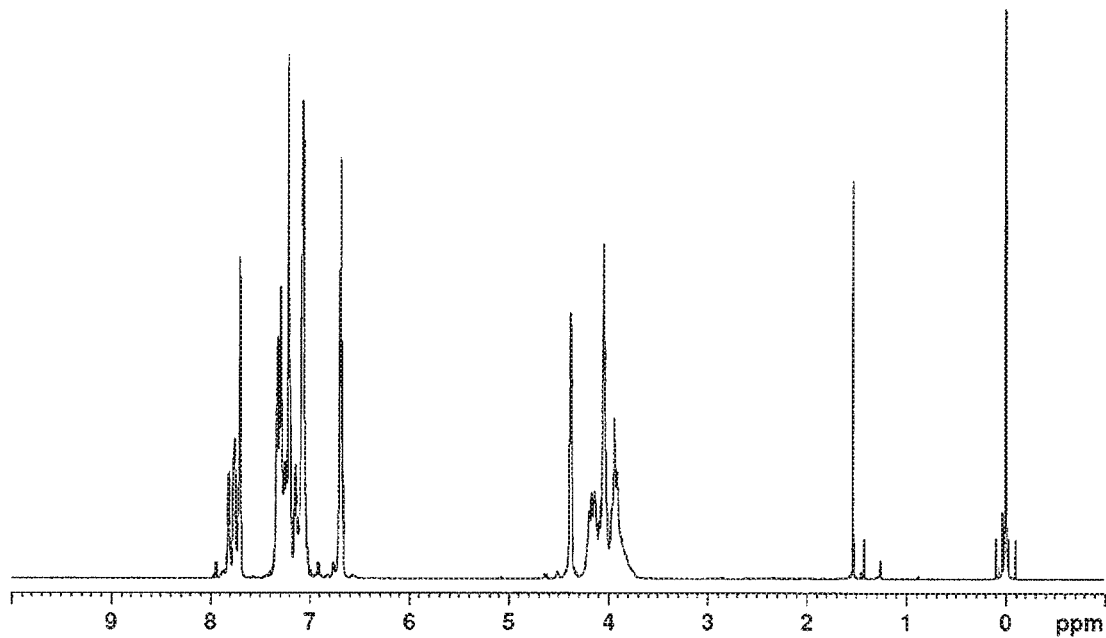
[Figure 7b]
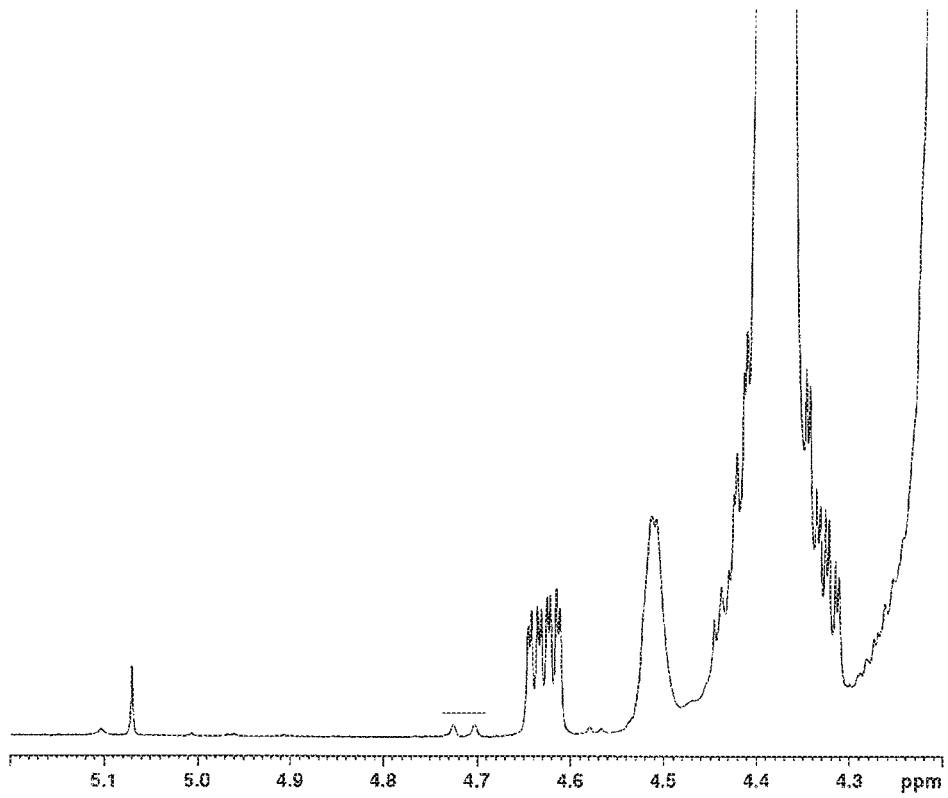

RESIN COMPOSITION, AND OPTICAL LENS, SHEET AND FILM WHICH CONTAIN SAME

TECHNICAL FIELD

The present invention relates to a resin composition containing a resin having a specific fluorene structure, and an optical lens, a sheet, and film containing the resin composition.

BACKGROUND ART

Optical glasses or optical transparent resins are used as materials for optical elements used for optical systems of various cameras such as cameras, film integrated cameras, and video cameras. There are various types of optical glasses which have excellent properties such as heat resistance, transparency, dimensional stability, chemical resistance, etc. and varieties of refractive indices and Abbe numbers, but such optical glasses have problems of poor forming fabricability and low productivity, in addition to high material cost. In particular, processing into aspherical lenses that are used for aberration correction requires an exceptionally high level of technique and high cost, which are therefore serious obstacles for practical use.

In contrast to the aforementioned optical glasses, optical transparent resins, particularly, optical lenses consisting of thermoplastic transparent resins have advantages that such optical lenses can be mass-produced by injection molding, and aspherical lenses also can be easily produced, and are therefore used currently as camera lenses. Examples of the optical transparent resins include polycarbonate consisting of bisphenol A, polymethyl methacrylate, or amorphous polyolefin. Further, polycarbonate resins are particularly used also as sheets or films for optical applications. Sheets and films consisting of polycarbonate resins have high transparency and heat resistance, and are therefore used suitably for front protective sheets, light guiding sheets, or the like, of liquid crystal display devices.

However, polycarbonate resins consisting of bisphenol A have a disadvantage of high birefringence, and therefore the applications thereof are constrained. In particular, in applications for mobile phone cameras and digital cameras in recent years, there is a growing demand for resin materials having high imaging performance and low birefringence, with an increase in resolution due to an increase in the number of pixels. Patent Literature 1 discloses that use of dicarboxylic acid having a fluorene structure as a raw material for polyester resins is effective for reducing the birefringence.

Aiming at further excellent materials, a resin having various excellent optical properties such as high refractive index and low Abbe number has been developed (Patent Literature 2). However, in recent years, while electronic devices such as digital cameras, smartphones, and tablets are widely adopted, and various models are put on the market, functions of cameras mounted on such devices are being progressively enhanced (such as higher pixel density and lower F value). Therefore, lenses having high refractive index and small size are required, and aspherical lenses are often used in designing lens units. Further, with the enhancement of functions of the devices, sheets or films having excellent shapability are also desired. In order to obtain such precision lenses and sheets or films having excellent shap-ability, resins having not only optical properties but also good fluidity and strength are desired.

CITATION LIST

Patent Literature

Patent Literature 1: Japanese Patent Laid-Open No. 2013-64119

Patent Literature 2: International Publication No. 2014/073496

SUMMARY

Technical Problem

In view of the aforementioned problems, it is an object of the present invention to provide a resin composition having excellent fluidity and strength.

Solution to Problem

As a result of extensive studies, the inventors have found that a resin composition containing a resin having a specific fluorene structure and further containing a predetermined amount of a polymer and/or a compound which have vinyl groups at their terminals has excellent fluidity and strength. The present invention is, for example, as follows.

[1] A resin composition comprising: a resin containing a repeating unit derived from a compound represented by formula (1) below (but excluding a polymer having a terminal structure represented by formula (A) below):

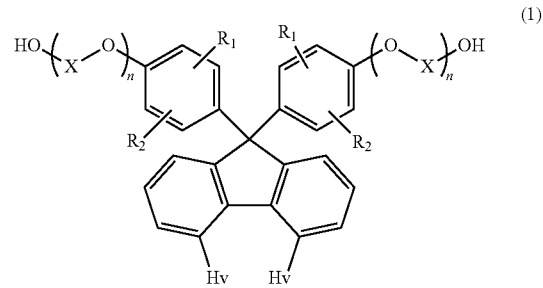

and the polymer having the terminal structure represented by formula (A) below and/or a compound represented by formula (B) below:

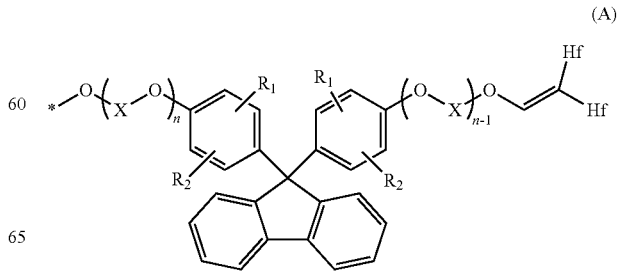

3

-continued (B)

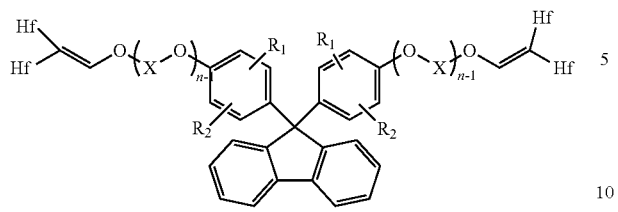

wherein in formulas (1), (A), and (B), $R_1$ and $R_2$ are each independently selected from a hydrogen atom, an alkyl group having 1 to 20 carbon atoms, an alkoxyl group having 1 to 20 carbon atoms, a cycloalkyl group having 5 to 20 carbon atoms, a cycloalkoxyl group having 5 to 20 carbon atoms, an aryl group having 6 to 20 carbon atoms, an aryloxy group having 6 to 20 carbon atoms, and a halogen atom;

each X is independently an optionally branched alkylene group having 2 to 6 carbon atoms;

Hv and Hf are each a hydrogen atom;

each n is independently an integer of 1 to 5; and

* is a polymer chain, wherein a $^1$H-NMR spectrum of the resin composition satisfies a relationship of:

$$\frac{\text{Integral value of proton peaks corresponding to } Hf \text{ in formulas } (A) \text{ and } (B)}{\text{Integral value of proton peaks corresponding to } Hv \text{ in formula } (1)} \times 100 = 0.01 \text{ to } 1.0.$$

[2] The resin composition according to [1], wherein the resin containing the repeating unit derived from the compound represented by formula (1) is a resin consisting of the repeating unit derived from the compound represented by formula (1).

[3] The resin composition according to [1], wherein the resin further contains a repeating unit derived from a compound represented by formula (2) below:

(2)

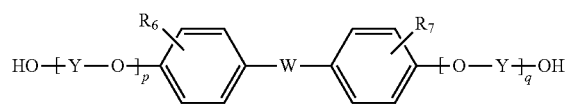

wherein $R_6$ and $R_7$ are each independently selected from a hydrogen atom, an alkyl group having 1 to 20 carbon atoms, an alkoxyl group having 1 to 20 carbon atoms, a cycloalkyl group having 5 to 20 carbon atoms, a cycloalkoxyl group having 5 to 20 carbon atoms, an aryl group having 6 to 20 carbon atoms, an aryloxy group having 6 to 20 carbon atoms, and a halogen atom;

each Y is independently an optionally branched alkylene group having 2 to 6 carbon atoms, a cycloalkylene group having 6 to 10 carbon atoms, or an arylene group having 6 to 10 carbon atoms;

4

W is a single bond or selected from the group consisting of:

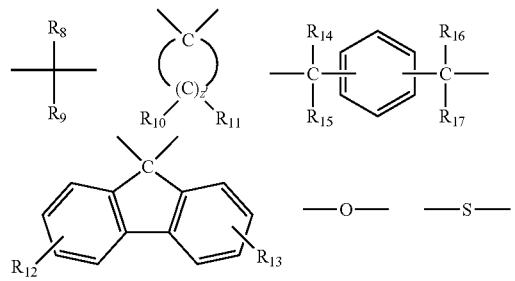

wherein $R_8$, $R_9$, and $R_{14}$ to $R_{17}$ are each independently selected from a hydrogen atom, an alkyl group having 1 to 10 carbon atoms, and a phenyl group having 6 to 10 carbon atoms; $R_{10}$ and $R_{11}$ are each independently selected from a hydrogen atom and an alkyl group having 1 to 5 carbon atoms; $R_{12}$ and $R_{13}$ are each independently selected from a hydrogen atom, an alkyl group having 1 to 5 carbon atoms, and a phenyl group; and $Z'$ is an integer of 3 to 11; and p and q are each independently an integer of 0 to 5.

[4] The resin composition according to [3], wherein p and q are 0, and

W is:

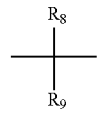

wherein $R_8$ and $R_9$ are as defined in [3].

[5] The resin composition according to [3], wherein the compound represented by formula (2) is bisphenol A.

[6] The resin composition according to any one of [3] to [5], wherein a molar ratio of the repeating unit derived from the compound represented by formula (1) to the repeating unit derived from the compound represented by formula (2) in the resin is 20:80 to 99:1.

[7] The resin composition according to any one of [1] to [6], wherein the $^1$H-NMR spectrum of the resin composition satisfies a relationship of:

$$\frac{\text{Integral value of proton peaks corresponding to } Hf \text{ in formulas } (A) \text{ and } (B)}{\text{Integral value of proton peaks corresponding to } Hv \text{ in formula } (1)} \times 100 =$$

$$\frac{\text{Integral value of peaks at 4.75 to 4.69 ppm}}{\text{Integral value of peaks at 7.83 to 7.65 ppm}} \times 100 = 0.01\text{-}1.00.$$

[8] A resin composition comprising: a resin containing a repeating unit derived from a compound represented by formula (1) below and a repeating unit represented by formula (3) below (but excluding a polymer having a terminal structure represented by formula (A) below and a polymer having a terminal structure represented by formula (C) below):

(1)

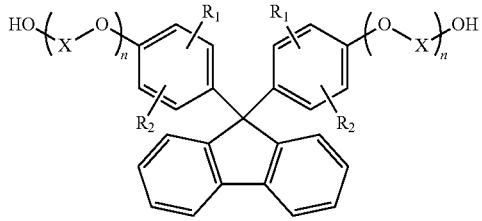

(3)

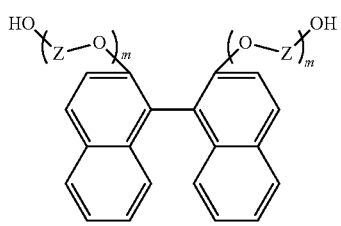

and the polymer having the terminal structure represented by formula (A) below, a compound represented by formula (B) below, the polymer having the terminal structure represented by formula (C) below, and/or a compound represented by formula (D) below:

(A)

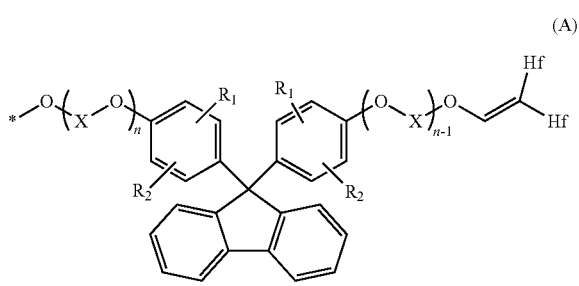

(B)

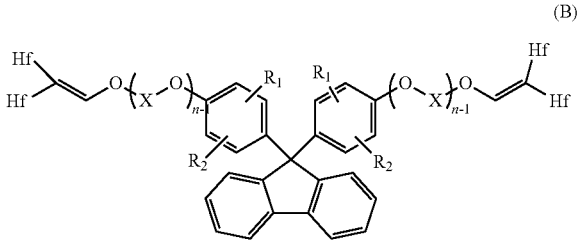

(C)

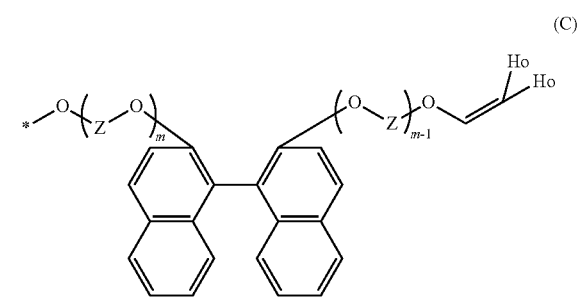

(D)

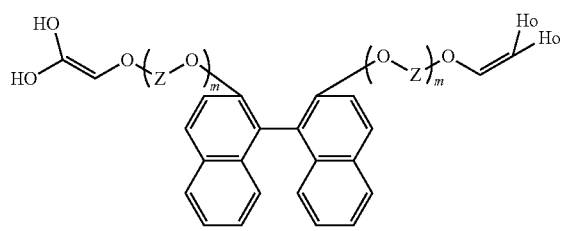

wherein in formulas (1), (3), (A), (B), (C), and (D), $R_1$ and $R_2$ are each independently selected from a hydrogen atom, an alkyl group having 1 to 20 carbon atoms, an alkoxyl group having 1 to 20 carbon atoms, a cycloalkyl group having 5 to 20 carbon atoms, a cycloalkoxyl group having 5 to 20 carbon atoms, an aryl group having 6 to 20 carbon atoms, an aryloxy group having 6 to 20 carbon atoms, and a halogen atom;

X and Z are each independently an optionally branched alkylene group having 2 to 6 carbon atoms;

n and m are each independently an integer of 1 to 5;

Hf and Ho are each a hydrogen atom; and each * is independently a polymer chain, wherein a $^1$H-NMR spectrum of the resin composition satisfies a relationship of:

$$\frac{\text{Integral value of peaks at 4.75 to 4.55 ppm}}{\text{Integral value of peaks at 4.80 to 2.80 ppm}} \times 100 = 0.01 \text{ to } 2.0.$$

[9] The resin composition according to [8], wherein the $^1$H-NMR spectrum satisfies a relationship of:

$$\frac{\text{Integral value of peaks at 4.75 to 4.69 ppm}}{\text{Integral value of peaks at 4.80 to 2.80 ppm}} \times 100 = 0.01 \text{ to } 1.0$$

or $$\frac{\text{Integral value of peaks at 4.59 to 4.55 ppm}}{\text{Integral value of peaks at 4.80 to 2.80 ppm}} \times 100 = 0.01 \text{ to } 1.0.$$

[10] The resin composition according to [8] or [9], wherein the $^1$H-NMR spectrum satisfies a relationship of:

$$\frac{\text{Integral value of peaks at 4.69 to 4.59 ppm}}{\text{Integral value of peaks at 4.80 to 2.80 ppm}} \times 100 = 0.05 \text{ to } 1.0.$$

[11] The resin composition according to any one of [1] to [10], wherein every X in formulas (1), (A), and (B) is ethylene.

[12] The resin composition according to any one of [1] to [11], wherein every n in formulas (1), (A), and (B) is 1.

[13] The resin composition according to any one of [1] to [12], wherein the compound represented by formula (1) is 9,9-bis(4-(2-hydroxyethoxy)phenyl)fluorene or 9,9-bis(4-(2-hydroxyethoxy)-3-phenylphenyl)fluorene.

[14] The resin composition according to any one of [8] to [13], wherein every Z in formulas (3), (C), and (D) is ethylene.

[15] The resin composition according to any one of [8] to [14], wherein every m in formulas (3), (C), and (D) is 1.

[16] The resin composition according to any one of [8] to [15], wherein the compound represented by formula (3) is 2,2'-bis(2-hydroxyethoxy)-1,1'-binaphthalene.

[16-1] The resin composition according to any one of [8] to [16], wherein a molar ratio of the repeating unit derived from the compound represented by formula (1) to the repeating unit derived from the compound represented by formula (3) in the resin is 20:80 to 99:1.

[17] The resin composition according to any one of [1] to [16-1], wherein the resin is selected from the group consisting of a polycarbonate resin, a polyester resin, and a polyester carbonate resin.

[18] The resin composition according to [17], wherein the resin is a polycarbonate resin.

[18-1] The resin composition according to any one of [1] to [18], wherein the resin is obtained by polymerization at a final temperature of 240° C. or more and less than 300° C.

[18-2] The resin composition according to [18-1], wherein the polymerization is performed at a pressure of 1 Torr or less.

[18-3] The resin composition according to any one of [1] to [18-2], having a melt volume rate (MVR) of 30 cm³/10 min or more.

[18-4] The resin composition according to any one of [1] to [18-3], having a bending strength of 80 MPa or more.

[19] An optical lens comprising the resin composition according to any one of [1] to [18-4].

[20] A sheet or a film comprising the resin composition according to any one of [1] to [18-4].

Advantageous Effects of Invention

The present invention can provide a resin composition having excellent fluidity and strength.

BRIEF DESCRIPTION OF DRAWINGS

FIGS. 1a, 1b and 1c are ¹H-NMR charts of a resin composition produced in Example 1.

FIGS. 2a and 2b are ¹H-NMR charts of a resin composition produced in Example 2.

FIGS. 3a and 3b are ¹H-NMR charts of a resin composition produced in Example 3.

FIGS. 4a and 4b are ¹H-NMR charts of a resin composition produced in Example 4.

FIGS. 5a and 5b are ¹H-NMR charts of a resin composition produced in Example 5.

FIGS. 6a and 6b are ¹H-NMR charts of a resin composition produced in Comparative Example 1.

FIGS. 7a and 7b are ¹H-NMR charts of a resin composition produced in Comparative Example 2.

DESCRIPTION OF EMBODIMENTS

Hereinafter, embodiments of the present invention will be described in detail.

A resin composition of the present invention comprises: a resin containing a repeating unit derived from a compound represented by formula (1) below (hereinafter also referred to as resin (a)) (but excluding a polymer having a terminal structure represented by formula (A) below):

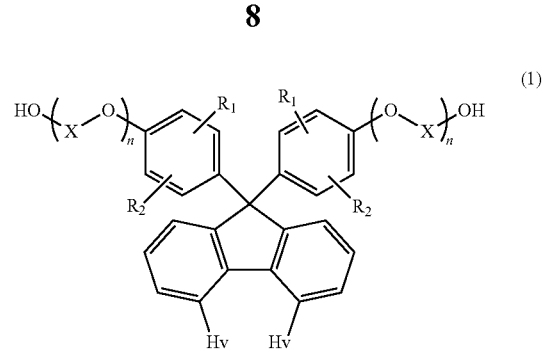

and the polymer having the terminal structure represented by formula (A) below and/or a compound represented by formula (B) below:

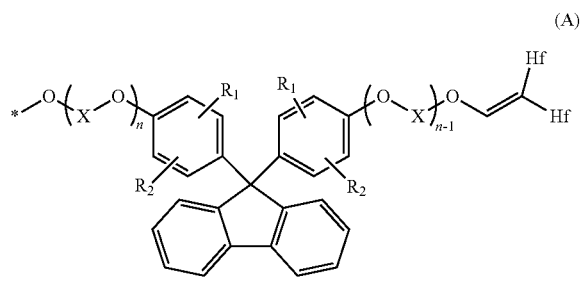

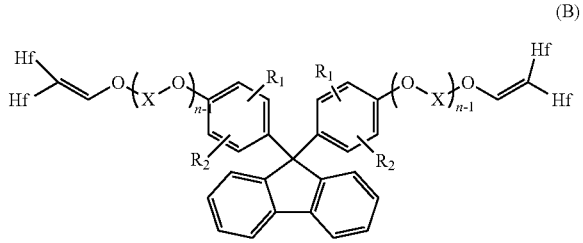

Further, the total content of the polymer having the terminal structure represented by formula (A) and/or the compound represented by formula (B) in the resin composition is an amount that satisfies the following relationship when the ¹H-NMR spectrum of the resin composition is measured:

$$\frac{\text{Integral value of proton peaks corresponding to } Hf \text{ in compounds of formulas } (A) \text{ and } (B)}{\text{Integral value of proton peaks corresponding to } Hv \text{ in repeating units derived from compound of formula (1)}} \times 100 = \quad (I)$$

0.01 to 1.0.

The polymer having the terminal structure represented by formula (A) and the compound represented by formula (B) are by-products that can occur when producing resin (a) by polymerization reaction. The value calculated by formula (I) above is preferably 0.03 to 0.9, more preferably 0.03 to 0.7, particularly preferably 0.1 to 0.5.

Hereinafter, the vinyl groups located at the terminals of formulas (A) and (B) are referred to as "fluorene-based vinyl terminal groups", and the value calculated by formula (I) is referred to as "amount of fluorene-based vinyl terminal groups".

In formula (I), it can be considered as:

$$\frac{\text{Integral value of proton peaks corresponding to } Hf \text{ in compounds of formulas } (A) \text{ and } (B)}{\text{Integral value of proton peaks corresponding to } Hv \text{ in repeating unit derived from compound of formula (1)}} =$$

$$\frac{\text{Integral value of peaks at 4.75 to 4.69 ppm}}{\text{Integral value of peaks at 7.83 to 7.65 ppm}}.$$

Here, the "integral value of proton peaks" and the "integral value of peaks" are area values, that is, integral values of signals of the NMR spectrum ($^1$H-NMR spectrum) of hydrogen nuclei $^1$H as measured by NMR (nuclear magnetic resonance) spectroscopy. Generally, NMR spectroscopy is a measurement method focusing on atomic nuclei of a substance and enables atomic nuclei constituting each molecule themselves to be quantitatively measured. That is, in the case of $^1$H-NMR, the integral value of the observed signals indicates the abundance ratio of $^1$H in the molecule. In the present invention, the attribute of $^1$H is inferred from a chemical shift value of the $^1$H-NMR spectrum, and an integral value of $^1$H signals is determined for each chemical shift value.

As described above, the inventors have found that a resin composition containing a resin having a specific fluorene structure (that is, resin (a)) and further containing a predetermined amount of a polymer having a vinyl group at its terminal (that is, the polymer having the terminal structure represented by formula (A)) and/or a compound having a vinyl group at its terminal (that is, the compound represented by formula (B)) has excellent fluidity and strength. The resin composition having excellent fluidity and strength has excellent moldability and is therefore suitable as a material for precision members. Therefore, the resin composition of the present invention can be suitably used as a material for sheets and films used for optical lenses in digital cameras, smartphones, tablets, and the like, and front protective sheets (films), light guiding sheets (films), and the like, of liquid crystal display devices. Further, the resin composition is also suitable as a material for sheets and films having patterns on their surfaces.

Although the reason why the resin composition of the present invention has excellent fluidity and strength is not clear, but it is inferred as follows.

Generally, the terminal structures of compounds tend to affect the physical properties of resin compositions considering the abundance in the compounds. In the resin composition of the present invention, due to the presence of the polymer having a carbon-carbon double bond at its terminal and represented by formula (A), rotation at the molecular level around the bond axis of the double bond is less likely to occur. This is inferred to contribute to the improvement in strength of molded products. Further, due to the presence of the compound represented by formula (B), a very small plasticity can be imparted to the resin composition, as a result of which, the fluidity of the resin is inferred to be improved.

Further, the resin composition of the present invention has good releasability and therefore has the advantages of less mold deposits during injection molding, excellent shape stability of injection molded products, and less coloration as well.

The amount of the polymer and the compound having vinyl groups at their terminals in the resin composition can be regulated to a desired range by controlling resin raw materials to be used, the reaction temperature, the reaction time, the pressure reduction degree, the molar ratio, the shape of the reaction vessel, the type of the stirring blade, or the like, in polymerization. For example, a resin composition containing a predetermined amount of the polymer and the compound having vinyl groups at their terminals and having excellent fluidity and strength can be obtained by regulating the final temperature in the polymerization reaction to 220° C. or more, preferably 220° C. or more and less than 300° C., more preferably 240° C. or more and less than 300° C., particularly preferably 240° C. to 280° C.

In formulas (1), (A), and (B), $R_1$ and $R_2$ are each independently selected from a hydrogen atom, an alkyl group having 1 to 20 carbon atoms, an alkoxyl group having 1 to 20 carbon atoms, a cycloalkyl group having 5 to 20 carbon atoms, a cycloalkoxyl group having 5 to 20 carbon atoms, an aryl group having 6 to 20 carbon atoms, an aryloxy group having 6 to 20 carbon atoms, and a halogen atom. Among these, a hydrogen atom, an alkyl group having 1 to 12 carbon atoms, or an aryl group having 6 to 12 carbon atoms is preferable, a hydrogen atom, a methyl group, an ethyl group, a propyl group, an isopropyl group, a butyl group, an isobutyl group, a sec-butyl group, a tert-butyl group, a cyclohepta group, a cyclopropyl group, or a phenyl group is more preferable, a hydrogen atom, a methyl group, or a phenyl group is particularly preferable, and a hydrogen atom or a phenyl group is most preferable.

Each X is independently an optionally branched alkylene group having 2 to 6 carbon atoms, preferably an alkylene group having 2 to 4 carbon atoms, more preferably an ethylene group or a propylene group, particularly preferably an ethylene group.

Hv and Hf are each a hydrogen atom.

Each n is independently an integer of 1 to 5, preferably an integer of 1 to 3, more preferably an integer of 1 to 2, particularly preferably 1.

\* is a polymer chain and has a structure in which a plurality of any repeating units constituting resin (a) are bound together. Specifically, the polymer chain represented by \* contains a repeating unit derived from the compound represented by formula (1). Further, in the case where resin (a) contains a repeating unit represented by formula (2) or a repeating unit represented by formula (3) described below, the polymer chain \* can contain these repeating units.

Examples of the compound represented by formula (1) include 9,9-bis(4-(2-hydroxyethoxy)phenyl)fluorene, 9,9-bis(4-(2-hydroxyethoxy)-3-methylphenyl)fluorene, 9,9-bis(4-hydroxy-3-ethylphenyl)fluorene, 9,9-bis(4-hydroxy-3-phenylphenyl)fluorene, and 9,9-bis(4-(2-hydroxyethoxy)-3-phenylphenyl)fluorene. Above all, 9,9-bis(4-(2-hydroxyethoxy)phenyl)fluorene (hereinafter also referred to as BPEF) or 9,9-bis(4-(2-hydroxyethoxy)-3-phenylphenyl)fluorene (hereinafter also referred to as BPPEF) is suitably used.

The ratio of the repeating unit derived from the compound represented by formula (1) in resin (a) is preferably 50 mol % or more, further preferably 80 mol % or more, particularly preferably 90 mol % or more, most preferably 100 mol %, based on all repeating units constituting resin (a) (excluding the carbonate binding moiety and the ester binding moiety). Resin (a) may contain a repeating unit other than the repeating unit derived from the compound represented by formula (1).

Hereinafter, preferable embodiments of the aforementioned resin composition will be described.

First Preferable Embodiment

The first preferable embodiment provides a resin composition comprising: a resin consisting of the repeating unit derived from the compound represented by formula (1) below (but excluding the polymer having the terminal structure represented by formula (A) below):

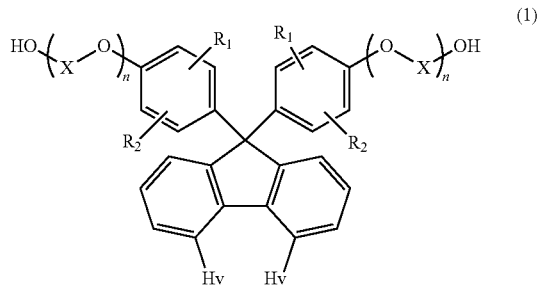

and the polymer having the terminal structure represented by formula (A) below and/or the compound represented by formula (B) below:

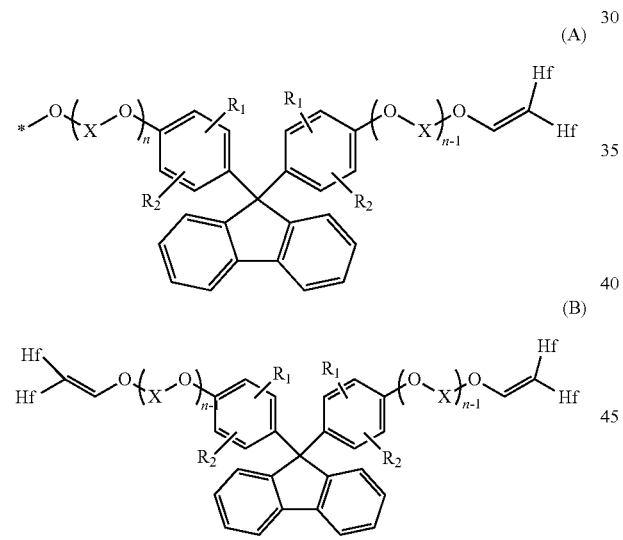

Here, the definitions of the respective substituents in formulas (1), (A), and (B) are as described above, and preferable substituents and preferable compounds are also as described above. However, the polymer chain represented by * in formula (A) contains the repeating unit derived from the compound represented by formula (1), and preferably consists of the repeating unit derived from the compound represented by formula (1).

The "resin (polymer chain) consisting of the repeating unit derived from the compound represented by formula (1)" means that the repeating unit excluding the carbonate binding moiety and the ester binding moiety in the resin consist of the repeating unit derived from the compound represented by formula (1). That is, in the case where the resin is a polycarbonate resin, the "resin consisting of the repeating unit derived from the compound represented by formula (1)" means a polycarbonate resin (polymer chain) consisting of the repeating unit derived from the compound represented by formula (1) and the carbonate binding moiety. Likewise, in the case where the resin is an ester resin, it means an ester resin (polymer chain) consisting of the repeating unit derived from the compound represented by formula (1) and the ester binding moiety, and in the case where the resin is a polyester carbonate resin, it is a polyester carbonate resin (polymer chain) consisting of the repeating unit derived from the compound represented by formula (1), the polycarbonate binding moiety, and the ester binding moiety. For example, the polycarbonate binding moiety is derived from phosgene or diester carbonate, and the ester binding moiety is derived from dicarboxylic acid or derivatives thereof.

The total content of the polymer having the terminal structure represented by formula (A) and the compound represented by formula (B) in the resin composition according to the first embodiment is preferably an amount that satisfies the following relationship (that is, the "amount of fluorene-based vinyl terminal groups") when the $^1$H-NMR spectrum of the resin composition is measured:

$$\frac{\text{Integral value of proton peaks corresponding to } Hf \text{ in compounds of formulas } (A) \text{ and } (B)}{\text{Integral value of proton peaks corresponding to } Hv \text{ in repeating unit derived from compound of formula (1)}} \times 100 = \quad (I)$$

$$0.01 \text{ to } 1.00.$$

In formula (I), it can be considered as:

$$\frac{\text{Integral value of proton peaks corresponding to } Hf \text{ in compounds of formulas } (A) \text{ and } (B)}{\text{Integral value of proton peaks corresponding to } Hv \text{ in repeating unit derived from compound of formula (1)}} =$$

$$\frac{\text{Integral value of peaks at 4.75 to 4.69 ppm}}{\text{Integral value of peaks at 7.83 to 7.65 ppm}}.$$

The amount of fluorene-based vinyl terminal groups calculated by formula (I) above is preferably 0.03 to 0.9, more preferably 0.03 to 0.7, particularly preferably 0.1 to 0.5.

Second Preferable Embodiment

The second preferable embodiment provides a resin composition comprising: a resin containing the repeating unit derived from the compound represented by formula (1) below and a repeating unit derived from a compound represented by formula (2) below (hereinafter also referred to as resin (b)) (but excluding the polymer having the terminal structure represented by formula (A) below):

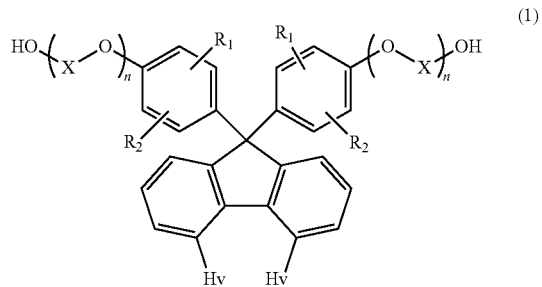

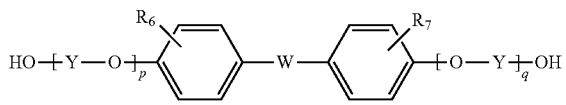

and the polymer having the terminal structure represented by formula (A) below and/or the compound represented by formula (B) below:

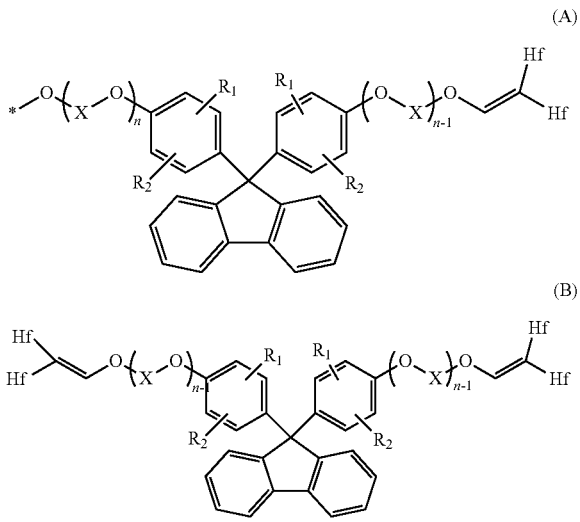

Here, the definitions of the respective substituents in formulas (1), (A), and (B) are as described above, and preferable substituents and preferable compounds are also as described above. However, the polymer chain represented by * in formula (A) contains the repeating unit derived from the compound represented by formula (1) and the repeating unit derived from the compound represented by formula (2), and preferably consists of the repeating unit derived from the compound represented by formula (1) and the repeating unit derived from the compound represented by formula (2). Here, the "polymer chain consisting of the repeating unit derived from the compound represented by formula (1) and the repeating unit derived from the compound represented by formula (2)" means that the repeating units excluding the carbonate binding moiety and the ester binding moiety in the polymer chain consist of the repeating unit derived from the compound represented by formula (1) and the repeating unit derived from the compound represented by formula (2).

The total content of the polymer having the terminal structure represented by formula (A) and the compound represented by formula (B) in the resin composition according to the second embodiment is preferably an amount that satisfies the following relationship (that is, "amount of fluorene-based vinyl terminal groups") when the $^1$H-NMR spectrum of the resin composition is measured:

$$\frac{\text{Integral value of proton peaks corresponding to } Hf \text{ in compounds of formulas } (A) \text{ and } (B)}{\text{Integral value of proton peaks corresponding to } Hv \text{ in repeating unit derived from compound of formula (1)}} \times 100 = \quad (I)$$

0.01 to 1.00.

In formula (I), it can be considered as:

$$\frac{\text{Integral value of proton peaks corresponding to } Hf \text{ in compounds of formulas } (A) \text{ and } (B)}{\text{Integral value of proton peaks corresponding to } Hv \text{ in repeating unit derived from compound of formula (1)}} =$$

$$\frac{\text{Integral value of peaks at 4.75 to 4.69 ppm}}{\text{Integral value of peaks at 7.83 to 7.65 ppm}}.$$

The amount of fluorene-based vinyl terminal groups calculated by formula (I) above is preferably 0.03 to 0.9, more preferably 0.03 to 0.7, particularly preferably 0.1 to 0.5.

In formula (2), $R_6$ and $R_7$ are each independently selected from a hydrogen atom, an alkyl group having 1 to 20 carbon atoms, an alkoxyl group having 1 to 20 carbon atoms, a cycloalkyl group having 3 to 20 carbon atoms, a cycloalkoxyl group having 5 to 20 carbon atoms, an aryl group having 6 to 20 carbon atoms, an aryloxy group having 6 to 20 carbon atoms, and a halogen atom. Among these, a hydrogen atom, an alkyl group having 1 to 10 carbon atoms, a cycloalkyl group having 5 to 20 carbon atoms, and an aryl group having 6 to 15 carbon atoms are preferable, a hydrogen atom, a methyl group, an ethyl group, a propyl group, a butyl group, a cyclohexyl group, and a phenyl group are more preferable, and a hydrogen atom, a methyl group, and a phenyl group are particularly preferable.

Each Y is independently an optionally branched alkylene group having 2 to 6 carbon atoms, a cycloalkylene group having 6 to 10 carbon atoms, or an arylene group having 6 to 10 carbon atoms. Among these, an alkylene group having 2 to 6 carbon atoms is preferable, ethylene or propylene is more preferable, and ethylene is particularly preferable.

W is a single bond or selected from the group consisting of:

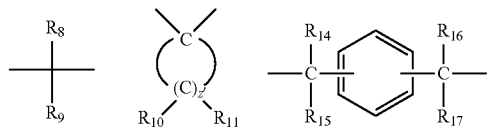

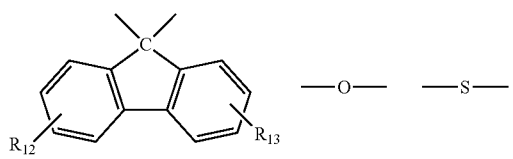

wherein $R_8$, $R_9$ and $R_{14}$ to $R_{17}$ are each independently selected from a hydrogen atom, an alkyl group having 1 to 10 carbon atoms, and a phenyl group having 6 to 10 carbon atoms; $R_{10}$ and $R_{11}$ are each independently selected from a hydrogen atom and an alkyl group having 1 to 5 carbon atoms; $R_{12}$ and $R_{13}$ are each independently selected from a hydrogen atom, an alkyl group having 1 to 5 carbon atoms, and a phenyl group; and Z' is an integer of 3 to 11.

W is preferably a single bond or

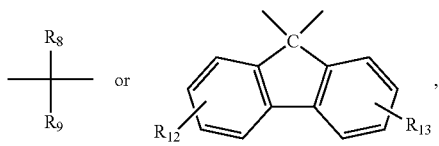

more preferably

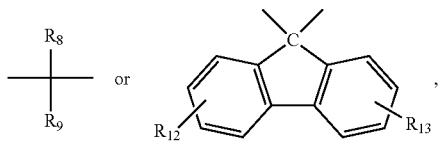

particularly preferably

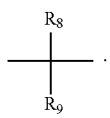

$R_8$, $R_9$, and $R_{14}$ to $R_{17}$ are preferably an alkyl group having 1 to 10 carbon atoms, a phenyl group having 6 to 10 carbon atoms, or a hydrogen atom, more preferably a hydrogen atom, a methyl group, or a phenyl group, particularly preferably a methyl group.

$R_{10}$ and $R_{11}$ are preferably a hydrogen atom or a methyl group, more preferably a hydrogen atom.

$R_{12}$ and $R_{13}$ are preferably each independently a hydrogen atom.

Z' is preferably 3 to 10, more preferably 3 to 5, particularly preferably 5.

p and q are each independently an integer of 0 to 5, preferably 0 to 3, more preferably 0 or 1, and it is particularly preferable that both of p and q are 0.

Specific examples of the compound represented by formula (2) include 2,2-bis(4-hydroxyphenyl)propane [=bisphenol A], 1,1-bis(4-hydroxyphenyl)-1-phenyl ethane [=bisphenol AP], 2,2-bis(4-hydroxyphenyl)hexafluoropropane [=bisphenol AF], 2,2-bis(4-hydroxyphenyl)butane [=bisphenol B], bis(4-hydroxyphenyl)diphenylmethane [=bisphenol BP], bis(4-hydroxy-3-methylphenyl)propane [=bisphenol C], 1,1-bis(4-hydroxyphenyl)ethane [=bisphenol E], bis(4-hydroxyphenyl)methane [=bisphenol F], bis(2-hydroxyphenyl)methane, 2,2-bis(4-hydroxy-3-isopropylphenyl)propane [=bisphenol G], 1,3-bis(2-(4-hydroxyphenyl)-2-propyl)benzene [=bisphenol M], bis(4-hydroxyphenyl)sulfone [=bisphenol S], 1,4-bis(2-(4-hydroxyphenyl)-2-propyl)benzene [=bisphenol P], bis(4-hydroxy-3-phenylphenyl]propane [=bisphenol PH], 1,1-bis(4-hydroxyphenyl)-3,3,5-trimethylcyclohexane [=bisphenol TMC], 1,1-bis(4-hydroxyphenyl)cyclohexane [=bisphenol Z], 1,1-bis(4-hydroxy-3-methylphenyl)cyclohexane (bisphenol OCZ), and 4,4-bisphenol. Among these, bisphenol A, bisphenol M, bisphenol C, bisphenol Z, and bisphenol TMC are preferable, and bisphenol A is more preferable.

The total ratio of the repeating unit derived from the compound represented by formula (1) and the repeating unit derived from the compound represented by formula (2) is preferably 40 mol % or more, more preferably 50 mol % or more, further preferably 80 mol % or more, particularly preferably 90 mol % or more, most preferably 100 mol %, based on all repeating units constituting resin (b) (excluding the carbonate binding moiety and the ester binding moiety).

Resin (b) may contain a repeating unit other than the repeating unit derived from the compound represented by formula (1) and the repeating unit derived from the compound represented by formula (2).

The molar ratio of the repeating unit derived from the compound represented by formula (1) to the repeating unit derived from the compound represented by formula (2) is preferably 20:80 to 99:1, more preferably 30:70 to 98:2, particularly preferably 40:60 to 95:5.

Third Preferable Embodiment

The third preferable embodiment provides a resin composition comprising: a resin containing a repeating unit derived from a compound represented by formula (1) below and a repeating unit represented by formula (3) below (hereinafter also referred to as resin (c)) (but excluding the polymer having the terminal structure represented by formula (A) below and a polymer having a terminal structure represented by formula (C) below):

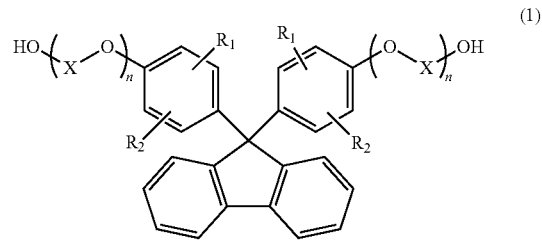

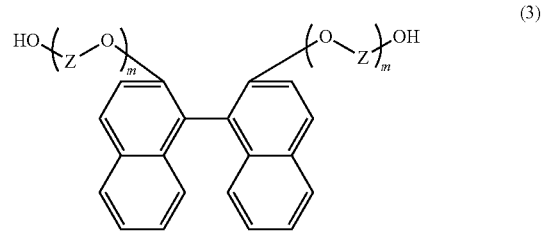

the polymer having the terminal structure represented by formula (A) below, the compound represented by formula (B) below, the polymer having the terminal structure represented by formula (C) below, and/or a compound represented by formula (D) below:

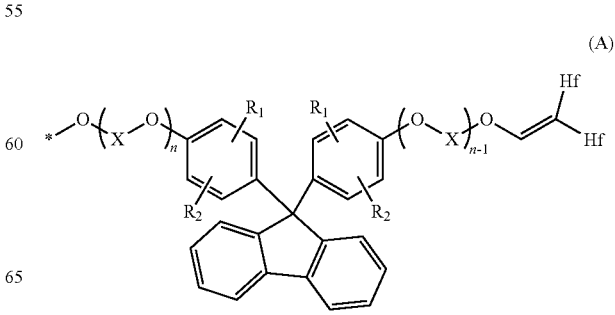

-continued

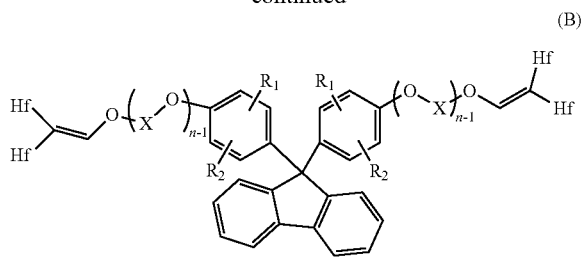
(B)

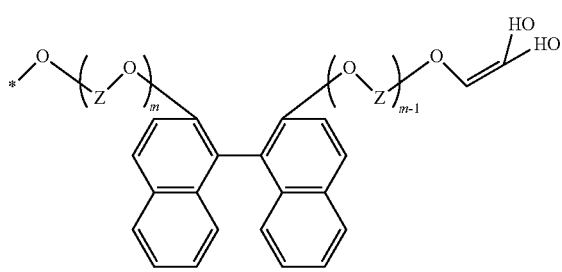
(C)

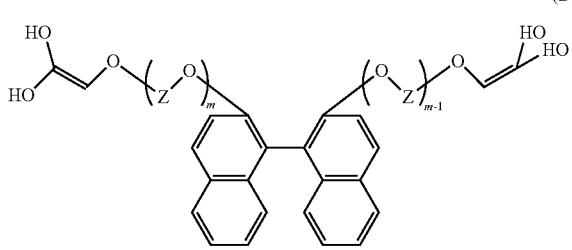
(D)

Here, the respective substituents in formulas (1), (A), and (B) are as described above, and preferable substituents and preferable compounds are also as described above. However, the polymer chain represented by * in formulas (A) and (C) contains the repeating unit derived from the compound represented by formula (1) and a repeating unit derived from a compound represented by formula (3), and preferably consists of the repeating unit derived from the compound represented by formula (1) and the repeating unit derived from the compound represented by formula (3). Here, the "polymer chain consisting of the repeating unit derived from the compound represented by formula (1) and the repeating unit derived from the compound represented by formula (2)" means that the repeating units in the polymer chain excluding the carbonate binding moiety and the ester binding moiety consist of the repeating unit derived from the compound represented by formula (1) and the repeating unit derived from the compound represented by formula (2).

In formulas (3), (C), and (D), each Z is independently an optionally branched alkylene group having 2 to 6 carbon atoms, preferably an alkylene group having 2 to 4 carbon atoms, more preferably an ethylene group or a propylene group, particularly preferably an ethylene group.

Each m is independently an integer of 1 to 5, preferably an integer of 1 to 3, more preferably an integer of 1 to 2, particularly preferably 1.

Ho is a hydrogen atom.

Examples of the compound represented by formula (3) include 2,2'-bis(hydroxymethoxy)-1,1'-binaphthalene, 2,2'-bis(2-hydroxyethoxy)-1,1'-binaphthalene, 2,2'-bis(3-hydroxypropyloxy)-1,1'-binaphthalene, and 2,2'-bis(4-hydroxybutoxy)-1,1'-binaphthalene. Above all, 2,2'-bis(2-hydroxyethoxy)-1,1'-binaphthalene (hereinafter also referred to as BHEBN) is suitably used.

The total content of the polymer having the terminal structure represented by formula (A) and the compound represented by formula (B) in the resin composition according to the third embodiment is preferably an amount that satisfies the following relationship (that is, "amount of fluorene-based vinyl terminal groups") when the $^1$H-NMR spectrum of the resin composition is measured:

$$\frac{\text{Integral value of peaks at 4.75 to 4.69 ppm}}{\text{Integral value of peaks at 4.80 to 2.80 ppm}} \times 100 = 0.01 \text{ to } 1.0 \quad \text{(II)}$$

or $$\frac{\text{Integral value of peaks at 4.59 to 4.55 ppm}}{\text{Integral value of peaks at 4.80 to 2.80 ppm}} \times 100 = 0.01 \text{ to } 1.0. \quad \text{(III)}$$

The amount of fluorene-based vinyl terminal groups calculated by formula (II) or (III) is preferably 0.03 to 0.9, more preferably 0.03 to 0.7, particularly preferably 0.1 to 0.5.

Which one of formulas (II) and (III) is satisfied depends on the structure of the compound of formula (1), but any one of the relationships may be satisfied. Specifically, in the case where both of $R_1$ and $R_2$ in formula (1) are hydrogen atoms, the $^1$H-NMR spectrum of the composition satisfies formula (II), and in the case where any one of $R_1$ and $R_2$ is not a hydrogen atom (such as a phenyl group), the $^1$H-NMR spectrum of the composition satisfies formula (III).

In formulas (II) and (III), $$\frac{\text{Integral value of peaks at 4.75 to 4.69 ppm}}{\text{Integral value of peaks at 4.80 to 2.80 ppm}} \text{ and}$$

$$\frac{\text{Integral value of peaks at 4.59 to 4.55 ppm}}{\text{Integral value of peaks at 4.80 to 2.80 ppm}} \text{ each correspond to}$$

$$\frac{\text{Integral value of proton peaks corresponding to } Hf \text{ in compounds of formulas } (A) \text{ and } (B)}{\left\{\begin{array}{c}\text{Integral value of proton peaks corresponding to } Hr \text{ in} \\ \text{repeating unit derived from the compound of formula (1) +} \\ \text{Integral value of proton peaks corresponding to } Hs \text{ in} \\ \text{repeating unit derived from the compound of formula (3) +} \\ \text{Integral value of proton peaks corresponding to } Hf \text{ in} \\ \text{compounds of formulas } (A) \text{ and } (B)\end{array}\right\}}.$$

In the aforementioned expression, the "Hr in repeating unit derived from the compound of formula (1)" means all hydrogen atoms contained in X of formula (1), and the "Hs in repeating unit derived from the compound of formula (3)" means all hydrogen atoms contained in Z of formula (3). For example, in the case where X and Z are each an ethylene group, the positions of Hr and Hs are as follows:

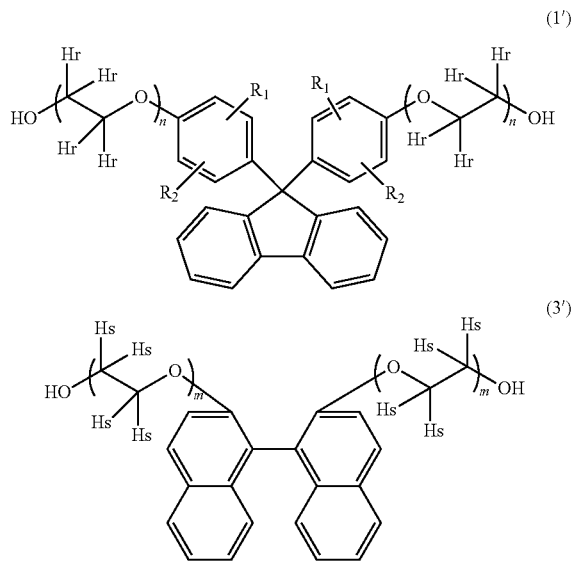

(1')

(3')

The total content of the polymer having the terminal structure represented by formula (C) and the compound represented by formula (D) in the resin composition according to the third embodiment is preferably an amount that satisfies the following relationship when the $^1$H-NMR spectrum of the resin composition is measured:

$$\frac{\text{Integral value of peaks at 4.69 to 4.59 ppm}}{\text{Integral value of peaks at 4.80 to 2.80 ppm}} \times 100 = \quad \text{(IV)}$$

0.05 to 1.0.

Hereinafter, the vinyl groups located at the terminals of formulas (C) and (D) are referred to as "binaphthol-based vinyl terminal groups", and a value calculated by formula (IV) is referred to as "amount of the binaphthol-based vinyl terminal groups". The value calculated by formula (IV) above is preferably 0.3 to 1.0, more preferably 0.3 to 0.9, particularly preferably 0.3 to 0.6.

In formula (IV), $\dfrac{\text{Integral value of peaks at 4.69 to 4.59 ppm}}{\text{Integral value of peaks at 4.80 to 2.80 ppm}}$ corresponds to $$\frac{\begin{array}{c}\text{Integral value of proton peaks corresponding to}\\ \text{Ho in compounds of formulas } (C) \text{ and } (D)\end{array}}{\left\{\begin{array}{c}\text{Integral value of proton peaks corresponding to } Hr \text{ in the}\\ \text{repeating unit derived from the compound of formula (1) +}\\ \text{Integral value of proton peaks corresponding to } Hs \text{ in the}\\ \text{repeating unit derived from the compound of formula (2) +}\\ \text{Integral value of proton peaks corresponding to } Ho \text{ in}\\ \text{compounds of formulas } (C) \text{ and } (D)\end{array}\right\}}.$$

Hr and Hs in the aforementioned expression are as defined above.

Considering formulas (II) to (IV) above together, the total content of the polymer having the terminal structure represented by formula (A), the compound represented by formula (B), the polymer having the terminal structure represented by formula (C), and the compound represented by formula (D) in the resin composition according to the third embodiment is preferably an amount that satisfies the following relationship (that is, "amount of fluorene-based vinyl terminal groups"+"amount of binaphthol-based vinyl terminal groups") when the $^1$H-NMR spectrum of the resin composition is measured:

$$\frac{\text{Integral value of peaks at 4.75 to 4.55 ppm}}{\text{Integral value of peaks at 4.80 to 2.80 ppm}} \times 100 = 0.01 \text{ to } 2.0. \quad \text{(V)}$$

That is, the sum of either formula (II) or (III) and formula (IV) is represented by formula (V). The value calculated by formula (V) above is preferably 0.1 to 2.0, more preferably 0.3 to 1.8, further preferably 0.4 to 1.4, particularly preferably 0.4 to 1.0.

The total ratio of the repeating unit derived from the compound represented by formula (1) and the repeating unit derived from the compound represented by formula (3) is preferably 40 mol % or more, more preferably 50 mol % or more, further preferably 80 mol % or more, particularly preferably 90 mol % or more, most preferably 100 mol %, based on all repeating units constituting resin (c) (excluding the carbonate binding moiety and the ester binding moiety). Resin (c) may contain a repeating unit other than the repeating unit derived from the compound represented by formula (1) and the repeating unit derived from the compound represented by formula (3).

The molar ratio of the repeating unit derived from the compound represented by formula (1) to the repeating unit derived from the compound represented by formula (3) is preferably 20:80 to 99:1, more preferably 30:70 to 95:5, particularly preferably 40:60 to 90:10.

<Method for Producing Resin>

The type of the resin of the present invention is not specifically limited, but polycarbonate resins, polyester resins, or polyester carbonate resins are preferable, and polycarbonate resins are more preferable. Further, such a resin may have any structure such as random, block, and alternating copolymer. Hereinafter, a polycarbonate resin will be described particularly in detail.

A polycarbonate resin is a resin in which each repeating unit constituting the resin is bonded via a carbonate bond. In the case where the resin containing the repeating unit derived from the compound represented by formula (1) in the present invention is such a polycarbonate resin, it can be produced by a melt polycondensation method, using the compound represented by formula (1) (and optionally the compound represented by formula (2) or the compound represented by formula (3)) and a carbonate precursor such as diester carbonate as raw materials, in the presence of a basic compound catalyst, a transesterification catalyst, or a mixed catalyst consisting of both of them, or in the absence of a catalyst.

Examples of the diester carbonate used for this reaction include diphenyl carbonate, ditolyl carbonate, bis(chlorophenyl) carbonate, m-cresyl carbonate, dimethyl carbonate, diethyl carbonate, dibutyl carbonate, and dicyclohexyl carbonate. Among these, diphenyl carbonate is particularly preferable. The diester carbonate is preferably used at a molar ratio of 0.97 to 1.20, further preferably a molar ratio of 0.98 to 1.10, per 1 mol in total of dihydroxy compounds. In the case where the amount of diester carbonate is out of the range, problems that the resin does not reach a desired molecular weight, and unreacted raw materials remain the resin, resulting in a reduction in optical properties, for example, can occur.

Examples of the basic compound catalyst particularly include alkali metal compounds, alkaline earth metal compounds, and nitrogen-containing compounds.

Examples of the alkali metal compounds include organic acid salts, inorganic salts, oxides, hydroxides, hydrides, or alkoxides, of alkali metals. Specifically, sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium borophenylate, sodium benzoate, potassium benzoate, cesium benzoate, lithium benzoate, disodium hydrogen phosphate, dipotassium hydrogen phosphate, dilithium hydrogen phosphate, disodium phenylphosphate, disodium salt, dipotassium salt, dicesium salt, or dilithium salt of bisphenol A, sodium salt, potassium salt, cesium salt, or lithium salt of phenol, or the like, is used therefor. Among these, sodium hydrogen carbonate is preferable, since it has high catalytic activity, and inexpensive sodium hydrogen carbonate with high purity is distributed.

Examples of the alkaline earth metal compounds include organic acid salts, inorganic salts, oxides, hydroxides, hydrides, or alkoxides, of alkaline earth metal compounds. Specifically, magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate, magnesium phenyl phosphate, or the like, is used therefor.

Examples of the nitrogen-containing compounds include quaternary ammonium hydroxides and salts thereof, and amines. Specifically, quaternary ammonium hydroxides having an alkyl group, an aryl group, or the like, such as tetramethylammonium hydroxide, tetraethylammonium hydroxide, tetrapropylammonium hydroxide, tetrabutylammonium hydroxide, and trimethylbenzylammonium hydroxide; tertiary amines such as triethylamine, dimethylbenzylamine, and triphenylamine; secondary amines such as diethylamine and dibutylamine; primary amines such as propylamine and butylamine; imidazoles such as 2-methylimidazole, 2-phenylimidazole, and benzoimidazole; or bases or basic salts such as ammonia, tetramethylammonium borohydride, tetrabutylammonium borohydride, tetrabutylammonium tetraphenylborate, and tetraphenylammonium tetraphenylborate are used therefor.

As the transesterification catalyst, salts such as zinc, tin, zirconium, and lead are preferably used, and these can be used individually or in combination.

As the transesterification catalyst, zinc acetate, zinc benzoate, zinc 2-ethylhexanoate, tin (II) chloride, tin (IV) chloride, tin (II) acetate, tin (IV) acetate, dibutyltin dilaurate, dibutyltin oxide, dibutyltin dimethoxide, zirconium acetylacetonate, zirconium oxyacetate, zirconium tetrabutoxide, lead (II) acetate, lead (IV) acetate, or the like, is specifically used.

Such a catalyst is used at a molar ratio of $1\times10^{-9}$ to $1\times10^{-3}$, preferably at a molar ratio of $1\times10^{-7}$ to $1\times10^{-4}$, per 1 mol in total of dihydroxy compounds.

Two or more types of catalysts may be used in combination. Further, the catalyst may be added as it is or may be added after being dissolved in a solvent such as water and phenol.

In the melt polycondensation method, melt polycondensation is performed by transesterification reaction using the raw materials and the catalyst described above, under heating and normal pressure or reduced pressure. That is, it is preferable to start the reaction at normal temperature and normal pressure and then to gradually raise the temperature and reduce the pressure while removing by-products.

Specifically, the reaction temperature in the final stage of the reaction is preferably 220° C. or more and less than 300° C., more preferably over 230° C. and 280° C. or less, particularly preferably 240 to 280° C., most preferably 240 to 260° C. The pressure reduction degree in the final stage of the reaction is preferably 100 to 0.01 Torr, more preferably 50 to 0.01 Torr, particularly preferably 5 to 0.1 Torr, most preferably 1 Torr or less (for example, 1 to 0.01 Torr). The catalyst may be present from the beginning of the reaction together with the raw materials or may be added in the course of the reaction. Here, the final stage of the reaction is a stage of performing polymerization reaction under reduced pressure (for example, 100 to 0.01 Torr) after performing transesterification reaction by melting the raw materials.

The melt polycondensation reaction may be performed continuously or may be performed batchwise. The reactor used for performing the reaction may be a vertical reactor equipped with an anchor-type stirring blade, a Maxblend stirring blade, a helical ribbon-type stirring blade, or the like, a horizontal reactor equipped with a paddle blade, a lattice blade, a spectacle-shaped blade, or the like, or an extruder-type reactor equipped with a screw. Further, these reactors are suitably used appropriately in combination, in consideration of the viscosity of the polymer.

In this method for producing a polycarbonate resin, the catalyst may be removed or inactivated after the completion of the polymerization reaction, in order to maintain thermostability and hydrolytic stability, but is not necessarily inactivated. In the case of inactivating the catalyst, a known method for inactivating a catalyst by adding an acidic substance can be suitably performed. Specifically, as the acidic substance, esters such as butyl benzoate; aromatic sulfonic acids such as p-toluenesulfonic acid; aromatic sulfonic acid esters such as butyl p-toluenesulfonate and hexyl p-toluenesulfonate; phosphoric acids such as phosphorous acid, phosphoric acid, and phosphonic acid; phosphite esters such as triphenyl phosphite, monophenyl phosphite, diphenyl phosphite, diethyl phosphite, di-n-propyl phosphite, di-n-butyl phosphite, di-n-hexyl phosphite, dioctyl phosphite, and monooctyl phosphite; phosphate esters such as triphenyl phosphate, diphenyl phosphate, monophenyl phosphate, dibutyl phosphate, dioctyl phosphate, and monooctyl phosphate; phosphonic acids such as diphenylphosphonic acid, dioctylphosphonic acid, and dibutylphosphonic acid; phosphonic acid esters such as diethylphenylphosphonate; phosphines such as triphenylphosphine and bis(diphenylphosphino)ethane; boric acids such as boric acid and phenylboric acid; aromatic sulfonates such as tetrabutylphosphonium salt of dodecylbenzenesulfonic acid; organic halides such as stearic acid chloride, benzoyl chloride, and p-toluenesulfonic acid chloride; alkyl sulfates such as dimethyl sulfate; and organic halides such as benzyl chloride are suitably used. In view of effects of the deactivator and the stability to the resin, p-toluene or butyl sulfonate is particularly preferable. Such a deactivator is used at 0.01 to 50 times by mole, preferably 0.3 to 20 times by mole, the amount of the catalyst. When the amount of the deactivator is less than 0.01 times by mole the amount of the catalyst, the inactivation effect is insufficient, which is not preferable. Further, when the amount of the deactivator is more than 50 times by mole the amount of the catalyst, the heat resistance of the resin is reduced, and the molded product tends to be colored, which is not preferable.

The aforementioned deactivator can be added by kneading and may be added continuously or batchwise. The temperature during kneading is preferably 200 to 350° C., more preferably 230 to 300° C., particularly preferably 250 to 280° C. As a kneader, an extruder is suitably used in the case of continuous addition, and a Labo Plastomill and a kneader are suitably used in the case of batch addition. Examples of the extruder include single-screw extruders, twin-screw extruders, and multi-screw extruders. In the extruder, a gear pump or the like for stably quantifying the output rate of the resin can be appropriately provided. The atmospheric pressure for melt-kneading of the resin composition is not particularly limited, and normal pressure or reduced pressure such as a pressure of normal (760 mmHg) to 0.1 mmHg is preferable, in order to prevent oxidation and remove decomposed products and components having a low boiling point such as phenols. The extruder may be ventilated or non-ventilated but is preferably ventilated for improving the quality of extruded products. The pressure at the vent port (vent pressure) may be normal or reduced pressure but may be, for example, a pressure of normal (760 mmHg) to 0.1 mmHg, preferably a pressure of about 100 to 0.1 mmHg, more preferably a pressure of about 50 to 0.1 mmHg, in order to prevent oxidation and remove decomposed products and components having a low boiling point such as phenols. Further, hydrogenation and dehydration may be performed for the purpose of reducing the components having a low boiling point such as phenols more efficiently.

The deactivator may be kneaded immediately after the completion of the polymerization reaction or may be kneaded after pelletizing the polymerized resin. Further, additives (such as an antioxidant, a release agent, an ultraviolet absorber, a flow modifier, a crystal nucleating agent, an enhancer, a dye, an antistatic agent, or an antibacterial agent) other than the deactivator can be added by the same method.

After the catalyst is inactivated (in the case where the deactivator is not added, after the completion of the polymerization reaction), a step of removing low boiling point compounds in the polymer by dehydration at a pressure of 0.1 to 1 mmHg and a temperature of 200 to 350° C. may be provided. The temperature in the dehydration removal is preferably 230 to 300° C., more preferably 250 to 280° C. For this step, a horizontal apparatus equipped with a stirring blade having excellent surface renewal performance such as a paddle blade, a lattice blade, and a spectacle-shaped blade, or a thin film evaporator is suitably used.

The polycarbonate resin is required to contain foreign matter as little as possible, and filtration of the molten raw materials, filtration of the catalyst solution, or the like is suitably performed. The mesh of the filter is preferably 5 μm or less, more preferably 1 μm or less. Further, filtration of the resin to be produced using a polymer filter is suitably performed. The mesh of the polymer filter is preferably 100 μm or less, more preferably 30 μm or less. Further, a step of collecting resin pellets of course needs to be carried out in a low dust environment, where class 6 or less is preferable, and class 5 or less is more preferable.

Further, the average molecular weight Mw of the polycarbonate resin in terms of polystyrene is preferably 20000 to 200000, further preferably 25000 to 120000, particularly preferably 25000 to 50000.

The Mw of less than 20000 is not preferable since the resin is brittle. The Mw is more than 200000 is not preferable, since the melt viscosity is high, and therefore drawing the resin out of the mold in molding is made difficult, further the fluidity deteriorates, and handling in a molten state is made difficult.

<Other Components>

The resin composition of the present invention may contain components other than those described above. For example, as the repeating unit of the "resin containing the repeating unit derived from the compound represented by formula (1)" in the present invention, a repeating unit derived from a compound other than the compounds of formulas (1) to (3) may be contained. The amount thereof is desirably 20 mol % or less, further desirably 10 mol % or less, per 100 mol % in total of the repeating units derived from the compounds represented by formulas (1) to (3). When the amount falls within this range, a high refractive index is maintained.

Examples of the repeating unit that may be further contained therein include repeating units derived from aliphatic dihydroxy compounds such as ethylene glycol, 1,3-propanediol, 1,2-propanediol, 1,4-butanediol, 1,3-butanediol, 1,2-butanediol, 1,5-heptanediol, and 1,6-hexanediol; alicyclic dihydroxy compounds such as 1,2-cyclohexanedimethanol, 1,3-cyclohexanedimethanol, 1,4-cyclohexanedimethanol, tricyclodecanedimethanol, pentacyclopentadecanedimethanol, 2,6-decalindimethanol, 1,5-decalindimethanol, 2,3-decalindimethanol, 2,3-norbornanedimethanol, 2,5-norboranedimethanol, and 1,3-adamantanedimethanol; and aromatic bisphenols such as 2,2-bis(4-hydroxyphenyl)propane [=bisphenol A], 2,2-bis(4-hydroxy-3,5-dimethylphenyl)propane, 2,2-bis(4-hydroxy-3,5-diethylphenyl)propane, 2,2-bis(4-hydroxy-(3,5-diphenyl)phenyl)propane, 2,2-bis(4-hydroxy-3,5-dibromophenyl)propane, 2,2-bis(4-hydroxyphenyl)pentane, 2,4'-dihydroxy-diphenylmethane, bis(4-hydroxyphenyl)methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl)sulfone, 2,4'-dihydroxydiphenylsulfone, bis(4-hydroxyphenyl) sulfide, 4,4'-dihydroxydiphenyl ether, 4,4'-dihydroxy-3,3'-dichlorodiphenyl ether, 9,9-bis(4-hydroxyphenyl)fluorene, and 9,9-bis(4-hydroxy-2-methylphenyl)fluorene.

Further, the resin composition of the present invention may contain other resins in a range not impairing the properties of the present invention, in addition to the resin containing the repeating unit derived from the compound represented by formula (1).

Examples of the other resins include: polyethylene, polypropylene, polyvinyl chloride, polystyrene, (meth)acrylic resin, ABS resin, polyamide, polyacetal, polycarbonate, polyphenylene ether, polyester, polyphenylene sulfide, polyimide, polyether sulfone, polyether ether ketone, fluororesin, cycloolefin polymer, ethylene-vinyl acetate copolymer, epoxy resin, silicone resin, phenolic resin, unsaturated polyester resin, and polyurethane.

The content of the other resins is preferably 20 parts by mass or less, further preferably 10 parts by mass or less, per 100 parts by weight of the resin containing the repeating unit derived from the compound represented by formula (1).

When the content of the other resins is excessively high, the transparency of the resin composition may be reduced due to deterioration in compatibility in some cases. In order to keep a low optical strain, the other resins are preferably not contained.

<Properties of Resin Composition>

The resin composition to be obtained by the method of the present invention has desired properties by containing a predetermined amount of the compound and the polymer containing terminal vinyl groups. The melt volume rate (MVR) of the resin composition is preferably 30 cm$^3$/10 min or more, more preferably 32 cm$^3$/10 min or more. The bending strength is preferably 80 MPa or more, more preferably 90 MPa or more, particularly preferably 100 MPa or more.

<Optical Molded Products>

Optical molded products can be produced using the resin composition of the present invention. The resin composition of the present invention has fluidity and strength suitable for molding and therefore can be used advantageously as a material for transparent conductive substrates used for liquid crystal displays, organic EL displays, solar cells, and the like, and optical molded products such as optical disks, liquid crystal panels, optical lenses, optical sheets, optical films, optical fibers, connectors, and deposited plastic reflectors. Such optical molded products containing the resin composition of the present invention have both high refractive index and excellent shapability.

Generally, resins produced using transesterification have branched structures in their molecular chains and therefore have high viscosity in the low shear rate region and non-Newtonian properties. Therefore, in the case of molding such a resin in the low shear region, non-uniform residual strain tends to occur conventionally, and there have been problems of warpage immediately after processing and deformation under high-temperature condition. Further, although the fluidity of the resin is improved as the temperature at which the resin is softened increases, the decomposition or coloration of the resin tend to occur during molding, and therefore the softening temperature has been constrained. However, the resin composition of the present invention has excellent fluidity and strength, and therefore can solve the aforementioned problems that possibly occur during molding. Further, molded products to be obtained have both high refractive index and excellent shapability, and are also excellent in various properties that are desired as optical molded products such as haze, total light transmittance, and Abbe number.

The optical molded products are molded by any method such as injection molding, compression molding, extrusion, and solution casting. In the molding, the resin composition of the present invention can be used by mixing with another resin such as polycarbonate resins and polyester resins. Further, additives such as antioxidants, processing stabilizers, light stabilizers, heavy metal deactivators, flame retardants, lubricants, antistatic agents, surfactants, antibacterial agents, release agents, ultraviolet absorbers, plasticizers, and compatibilizers may be mixed.

Examples of the antioxidants include triethylene glycol-bis[3-(3-tert-butyl-5-methyl-4-hydroxyphenyl) propionate], 1,6-hexanediol-bis[3-(3,5-di-tert-butyl-4-hydroxyphenyl) propionate], pentaerythritol-tetrakis[3-(3,5-di-tert-butyl-4-hydroxyphenyl) propionate], octadecyl-3-(3,5-di-tert-butyl-4-hydroxyphenyl) propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamide), 3,5-di-tert-butyl-4-hydroxy-benzyl phosphonate-diethyl ester, tris(3,5-di-tert-butyl-4-hydroxy-benzyl) isocyanurate, and 3,9-bis{1,1-dimethyl-2-[β-(3-tert-butyl-4-hydroxy-5-methylphenyl)propionyloxy]ethyl}-2,4,8,10-tetraoxaspiro(5,5)undecane. The content of the antioxidants in the resin composition is preferably 0.001 to 0.3 parts by weight per 100 parts by weight of the resin composition.

Examples of the processing stabilizers include phosphorus-based processing heat stabilizers and sulfur-based processing heat stabilizers. Examples of the phosphorus-based processing heat stabilizers include phosphorous acid, phosphoric acid, phosphonous acid, and phosphonic acid, and esters thereof. Specific examples thereof include triphenyl phosphite, tris(nonylphenyl) phosphite, tris(2,4-di-tert-butylphenyl) phosphite, tris(2,6-di-tert-butylphenyl) phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-dicumylphenyl) pentaerythritol diphosphite, bis(2,4-di-tert-butylphenyl) pentaerythritol diphosphite, distearyl pentaerythritol diphosphite, tributyl phosphate, triethyl phosphate, trimethyl phosphate, triphenyl phosphate, diphenyl monoorthoxenyl phosphate, dibutyl phosphate, dioctyl phosphate, diisopropyl phosphate, dimethyl benzenephosphonate, diethyl benzenephosphonate, dipropyl benzenephosphonate, tetrakis(2,4-di-t-butylphenyl)-4,4'-biphenylenediphosphonite, tetrakis(2,4-di-t-butylphenyl)-4,3'-biphenylenediphosphonite, tetrakis(2,4-di-t-butylphenyl)-3,3'-biphenylenediphosphonite, bis(2,4-di-tert-butylphenyl)-4-phenyl-phenylphosphonite, and bis(2,4-di-tert-butylphenyl)-3-phenyl-phenylphosphonite. The content of the phosphorus-based processing heat stabilizers in the resin composition is preferably 0.001 to 0.2 parts by weight per 100 parts by weight of the resin composition.

Examples of the sulfur-based processing heat stabilizers include pentaerythritol-tetrakis(3-laurylthiopropionate), pentaerythritol-tetrakis(3-myristylthiopropionate), pentaerythritol-tetrakis(3-stearylthiopropionate), dilauryl-3,3'-thiodipropionate, dimyristyl-3,3'-thiodipropionate, and distearyl-3,3'-thiodipropionate. The content of the sulfur-based processing heat stabilizers in the resin composition is preferably 0.001 to 0.2 parts by weight per 100 parts by weight of the resin composition.

As the release agents, release agents with 90 wt % or more consisting of esters of alcohols and fatty acids are preferable. Specific examples of the esters of alcohols and fatty acids include esters of monohydric alcohols and fatty acids, and partial esters or all esters of polyhydric alcohols and fatty acids. As the esters of monohydric alcohols and fatty acids above, esters of monohydric alcohols having 1 to 20 carbon atoms and saturated fatty acids having 10 to 30 carbon atoms are preferable. Further, as the partial esters or all esters of polyhydric alcohols and fatty acids, partial esters or all esters of polyhydric alcohols having 1 to 25 carbon atoms and saturated fatty acids having 10 to 30 carbon atoms are preferable.

Specific examples of the esters of monohydric alcohols and saturated fatty acids include stearyl stearate, palmityl palmitate, butyl stearate, methyl laurate, and isopropyl palmitate. Examples of the partial ester or all esters of polyhydric alcohols and saturated fatty acids include all esters or partial esters of stearic acid monoglyceride, stearic acid diglyceride, stearic acid triglyceride, stearic acid monosorbitate, behenic acid monoglyceride, capric acid monoglyceride, lauric acid monoglyceride, pentaerythritol monostearate, pentaerythritol tetrastearate, pentaerythritol tetrapelargonate, propylene glycol monostearate, biphenyl biphenate, sorbitan monostearate, 2-ethylhexyl stearate, and dipentaerythritol such as dipentaerythritol hexastearate. Among these, stearic acid monoglyceride and lauric acid monoglyceride are particularly preferable. The content of these release agents is preferably in the range of 0.005 to 2.0 parts by weight, more preferably in the range of 0.01 to 0.6 parts by weight, further preferably in the range of 0.02 to 0.5 parts by weight, per 100 parts by weight of the resin composition.

As the ultraviolet absorbers, at least one ultraviolet absorber selected from the group consisting of benzotriazole-based ultraviolet absorbers, benzophenone-based ultraviolet absorbers, triazine-based ultraviolet absorbers, cyclic imino ester-based ultraviolet absorbers, and cyano acrylate-based ultraviolet absorbers is preferable. That is, any one of the following ultraviolet absorbers may be used alone, or two or more of them may be used in combination.

Examples of the benzotriazole-based ultraviolet absorbers include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2N-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazole phenyl), 2,2'-p-phenylenebis (1,3-benzoxazin-4-one), and 2-[2-hydroxy-3-(3,4,5,6-tetrahydrophthalimidemethyl)-5-methylphenyl]benzotriazole.

Examples of the benzophenone-based ultraviolet absorbers include 2,4-dihydroxybenzophenone, 2-hydroxy-4-methoxybenzopheone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydratebenzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodium sulfoxybenzophenone, bis(5-benzoyl-4-hydroxy-2-methoxyphenyl)methane, 2-hydroxy-4-n-dodecyloxybenzophenone, and 2-hydroxy-4-methoxy-2'-carboxybenzophenone.

Examples of the triazine-based ultraviolet absorbers include 2-(4,6-diphenyl-1,3,5-triazin-2-yl)-5-[(hexyl)oxy]-phenol, 2-(4,6-bis(2,4-dimethylphenyl)-1,3,5-triazin-2-yl)-5-[(octyl)oxy]-phenol, and 2,4,6-tris(2-hydroxy-4-hexyloxy-3-methylphenyl)-1,3,5-triazine.

Examples of the cyclic imino ester-based ultraviolet absorbers include 2,2'-bis(3,1-benzoxazin-4-one), 2,2'-p-phenylenebis(3,1-benzoxazin-4-one), 2,2'-m-phenylenebis (3,1-benzoxazin-4-one), 2,2'-(4,4'-diphenylene)bis(3,1-benzoxazin-4-one), 2,2'-(2,6-naphthalene)bis(3,1-benzoxazin-4-one), 2,2'-(1,5-naphthalene)bis(3,1-benzoxazin-4-one), 2,2'-(2-methyl-p-phenylene)bis(3,1-benzoxazin-4-one), 2,2'-(2-nitro-p-phenylene)bis(3,1-benzoxazin-4-one), and 2,2'-(2-chloro-p-phenylene)bis(3,1-benzoxazin-4-one).

Examples of the cyano acrylate-based ultraviolet absorbers include 1,3-bis-[(2'-cyano-3',3'-diphenylacryloyl)oxy]-2,2-bis[(2-cyano-3,3-diphenylacryloyl)oxy]methyl)propane, and 1,3-bis-[(2-cyano-3,3-diphenylacryloyl)oxy]benzene.

The content of the ultraviolet absorbers is preferably 0.01 to 3.0 parts by weight, more preferably 0.02 to 1.0 part by weight, further preferably 0.05 to 0.8 parts by weight, per 100 parts by weight of the resin composition. When the amount blended falls within the aforementioned range, sufficient weather resistance can be imparted to the resin depending on the application.

On a surface of such an optical molded product, a coating layer such as an antireflection layer or a hard coating layer may be provided, as needed. The antireflection layer may be composed of a single layer or multiple layers and may be organic matter or inorganic matter but is preferably inorganic matter. Specific examples thereof include oxides or fluorides such as silicon oxide, aluminum oxide, zirconium oxide, titanium oxide, cerium oxide, magnesium oxide, and magnesium fluoride.

(Optical Films or Optical Sheets)

As an example of the optical molded products, optical films or optical sheets will be described. Films or sheets containing the resin composition of the present invention are suitably used, for example, for liquid crystal substrate films, prism sheets for improving the brightness of liquid crystal display devices, optical memory cards, or the like.

The structures of the sheets and the films are not specifically limited and may be a single layer structure or a multilayer structure. In the case of the multilayer structure, a structure in which two layers, three layers, or four or more layers composed of different resins are laminated may be employed.

As a method for producing a sheet and a film, various film forming methods such as melt extrusion (for example, T-die molding), cast coating (for example, flow casting), calendering, and hot pressing can be used and is not specifically limited. Preferable examples include melt extrusion. In the case of using melt extrusion, a well-known melt extrusion machine may be used as an apparatus. Hereinafter, a method for producing a sheet and a film using melt extrusion will be described.

First, the materials are put into the extruder to be melt-kneaded, and molten materials in the form of a sheet are extruded from the tip (lip) of a T-die. Examples of the extruder include single-screw extruders and twin-screw extruders. Further, in the case of producing a multilayer film composed of two or more layers, a plurality of extruders may be used. For example, in the case of producing a three-layered film, after materials are respectively melt-kneaded using three or two extruders, the molten materials can be distributed using a three-type three-layer distribution or two-type three-layer distribution feed block, so as to be coextruded by flowing into a single layer T-die. Alternatively, the molten materials of the each layer may be allowed to flow into a multi-manifold die and distributed into three layers before the lip, so as to be coextruded.

The extruder may be appropriately provided, for example, with a screen mesh for filtering and removing comparatively large foreign matter, or the like, in the materials, a polymer filter for filtering and removing comparatively small foreign matter, gel, or the like, in the materials, and a gear pump for quantifying the amount of resin to be extruded.

The T-die is a die having a slit-shaped lip, and examples thereof include feed block dies, manifold dies, fishtail dies, coat hanger dies, and screw dies. In the case of producing a multilayer thermoplastic resin film, multi manifold dies or the like may be used.

Further, the length of the lip in the width direction of the T-die is not particularly limited but is preferably 1.2 to 1.5 times the width of the product. The degree of opening of the lip may be appropriately adjusted depending on the thickness of the desired product but is generally 1.01 to 10 times, preferably 1.1 to 5 times, the thickness of the desired product. The degree of opening of the lip is preferably adjusted by bolts that are aligned in the width direction of the T-die. The degree of opening of the lip may be non-constant in the width direction, and the draw resonance phenomenon can be suppressed, for example, by adjusting the degree of opening of the lip at the ends to be narrower than the degree of opening of the lip at the center.

Subsequently, the extruded materials in the form of a sheet are sandwiched between two cooling rolls to be molded. The two cooling rolls both may be metal rolls or elastic rolls, or one of them may be a metal roll, with the other being an elastic roll. The surface state of the rolls is not specifically limited and may be mirror surfaces or may have patterns or projections and recesses, for example.

The metal rolls are not specifically limited as long as they have high stiffness, and examples thereof include drilled rolls and spiral rolls.

Examples of the elastic rolls include rubber rolls and elastic rolls provided with metal thin films on their outer circumferences (hereinafter also referred to as metal elastic rolls). Among these, metal elastic rolls are preferable.

The gap between the two cooling rolls (roll gap) is appropriately adjusted depending on the thickness of the desired product, and the roll gap is set so that both surfaces of the materials in the form of a sheet are respectively in contact with the surfaces at the center of the cooling rolls. Therefore, upon being sandwiched by the two cooling rolls, the materials in the form of a sheet are subjected to a constant pressure from the center of the cooling rolls, to be formed into a film or a sheet.

The crimping pressure of the two cooling rolls is arbitrary within the allowable range of the stiffness of the rolls. Further, the forming speed into a sheet and a film also can be appropriately adjusted.

In order to avoid contamination of foreign matter into the film as much as possible, the forming environment of course needs to be a low dust environment and is preferably class 6 or lower, more preferably class 5 or lower.

(Optical Lenses)

Specific examples of the optical molded products also include optical lenses. Optical lenses containing the resin composition of the present invention can be used in the fields in which expensive glass lenses with high refractive index have been conventionally used such as telescopes, binoculars, and television projectors, and are exceptionally useful. Using in the form of an aspherical lens, as needed, is preferable. The aspherical lens can reduce the spherical aberration to substantially zero even with one aspherical lens, and therefore there is no need to eliminate the spherical aberration by combining a plurality of spherical lenses, thereby enabling a reduction in weight and a reduction in production cost. Accordingly, the aspherical lens is particularly useful as a camera lens among optical lenses.

The optical lens is molded by any method such as injection molding, compression molding, and injection compression molding. Aspherical lenses with high refractive index and low birefringence, processing of which is technically difficult by using glass lenses, can be conveniently obtained by using the resin composition of the present invention.

Since the resin composition of the present invention has high fluidity, optical lenses having complex shapes with reduced thickness and reduced size can be produced. As a specific lens size, the thickness in the center portion is 0.05 to 3.0 mm, more preferably 0.05 to 2.0 mm, further preferably 0.1 to 2.0 mm. Further, the diameter is 1.0 mm to 20.0 mm, more preferably 1.0 to 10.0 mm, further preferably 3.0 to 10.0 mm.

In order to avoid contamination of foreign matter into the optical lens as much as possible, the molding environment of course needs to be a low dust environment and is preferably class 6 or lower, more preferably class 5 or lower.

EXAMPLES

Hereinafter, the present invention will be described by way of examples, but the present invention is not limited to these examples at all.

1. Resin Composition

The melt volume rate (MVR) and the bending strength in Examples were measured using the following methods.

(1) Melt Volume Rate (MVR)

The MVR is an index indicating the fluidity of the resin composition, and a larger value indicates a higher fluidity. Resin compositions produced in Examples were dried at 120° C. under vacuum for 4 hours and were measured, using a melt indexer T-111 manufactured by Toyo Seiki Seisakusho, Ltd., under conditions of a temperature of 260° C. and a loading of 2160 g.

(2) Bending Strength

The resin compositions produced in Examples were dried at 120° C. under vacuum for 4 hours, and thereafter test pieces of 80 mm×10 mm×4 mm were obtained by injection molding. The test pieces were subjected to a bending test according to JIS K 7171.

Further, $^1$H-NMR measurement conditions were as follows.

(3) $^1$H-NMR Measurement Conditions

Apparatus: AVANCE III HD 500 MHz, manufactured by Bruker Corporation
Flip angle: 30 degrees
Waiting time: 1 second
Cumulative number of times: 500 times
Measurement temperature: Room temperature (298K)
Concentration: 5 wt %
Solvent: Deuterated chloroform
Internal standard substance: Tetramethylsilane (TMS) 0.05 wt %

(4) Lens Moldability 4-1) Lens moldability 1 (releasability): The polycarbonate resin compositions were molded into lens-shaped test pieces (with a thickness of 0.5 mm and a diameter of 10 mm), using FUNUC ROBOSHOTS-2000i30A, manufactured by FANUC CORPORATION, at a molding temperature of 260° C. and a mold temperature of 135° C. With the peak pressure in injection being set to 55 MPa, resin compositions having an ejection pressure of less than 20 MPa were evaluated as A, resin compositions having an ejection pressure of 20 to 30 MPa were evaluated as B, and resin compositions having an ejection pressure of 30 MPa or more were evaluated as C.

The resin compositions having low ejection pressure above are easily molded and have excellent productivity.

4-2) Lens moldability 2 (mold deposits): Molding was performed 2000 shots, using Mini 7 molding machine, manufactured by NIIGATA ENGINEERING CO., LTD. and a drop-shaped mold, with a cylinder temperature of 250° C., a molding cycle of 11 seconds, a mold temperature of 80° C., and a clamping force of 7 tons. After the completion of the molding, an insert (corresponding to the convex surface of molded products) corresponding to the body part of the molded products provided on the mold operation side was detached from the mold after the continuous molding, and then mold deposits on the surface portion was observed by visual inspection.

Lens moldability 2 was evaluated as follows.
A: No mold deposits were observed by visual inspection, and releasability was good
B: Mold deposits were observed by visual inspection, and releasability was slightly poor
C: Mold deposits were observed by visual inspection, and releasability was poor Example 1: BPEF Homopolymer; 240° C.

18.07 kg (42.21 mol) of 9,9-bis(4-(2-hydroxyethoxy) phenyl)fluorene (hereinafter also referred to as "BPEF"), 9.20 kg (42.95 mol) of diphenyl carbonate (hereinafter also referred to as "DPC"), and $2.08 \times 10^{-2}$ g ($3.33 \times 10^{-4}$ mol) of sodium hydrogen carbonate were put into a 50-liter reactor equipped with a stirrer and a distillation apparatus. After conducting nitrogen purging, the mixture was stirred while being heated to 205° C. over 1 hour in a nitrogen atmosphere of 760 Torr. After the complete dissolution of the raw materials, the pressure reduction degree was adjusted to 150 Torr over 15 minutes, and the mixture was held for 20 minutes under conditions of 205° C. and 150 Torr, followed by transesterification reaction. Thereafter, the temperature was raised to 240° C. at a rate of 37.5° C./hr, and the mixture was held at 240° C. and 150 Torr for 10 minutes. Thereafter, the pressure was adjusted to 120 Torr over 10 minutes, and the mixture was held at 240° C. and 120 Torr for 70 minutes. Thereafter, the pressure was adjusted to 100 Torr over 10 minutes, and the mixture was held at 240° C. and 100 Torr for 10 minutes. Further, the pressure was reduced to 1 Torr or less over 40 minutes, and polymerization reaction was performed under stirring for 10 minutes under conditions of 240° C. and 1 Torr or less. After the completion of the reaction, nitrogen was blown into the reactor for pressurization, and the produced polycarbonate resin composition was taken out while being pelletized.

Example 1-1: BPEF Homopolymer; 260° C.

Transesterification reaction was performed in the same manner as in Example 1. Thereafter, the temperature was raised to 240° C. at a rate of 37.5° C./hr, and the mixture was held at 240° C. and 150 Torr for 10 minutes. Thereafter, the pressure was adjusted to 120 Torr over 10 minutes, and the mixture was held at 240° C. and 120 Torr for 70 minutes. Thereafter, the pressure was adjusted to 100 Torr over 10 minutes, and the mixture was held at 240° C. and 100 Torr for 10 minutes. Further, the conditions were changed to 260° C. and 1 Torr or less over 50 minutes, and polymerization reaction was performed under stirring for 10 minutes under conditions of 260° C. and 1 Torr or less. After the completion of the reaction, nitrogen was blown into the reactor for pressurization, and the produced polycarbonate resin composition was taken out while being pelletized.

Example 1-2: BPEF Homopolymer, 280° C.

Transesterification reaction was performed in the same manner as in Example 1. Thereafter, the temperature was raised to 240° C. at a rate of 37.5° C./hr, and the mixture was held at 240° C. and 150 Torr for 10 minutes. Thereafter, the pressure was adjusted to 120 Torr over 10 minutes, and the mixture was held at 240° C. and 120 Torr for 70 minutes. Thereafter, the pressure was adjusted to 100 Torr over 10 minutes, and the mixture was held at 240° C. and 100 Torr for 10 minutes. Further, the conditions were changed to 280° C. and 1 Torr or less over 60 minutes, and polymerization reaction was performed under stirring for 10 minutes under conditions of 280° C. and 1 Torr or less. After the completion of the reaction, nitrogen was blown into the reactor for pressurization, and the produced polycarbonate resin composition was taken out while being pelletized.

The MVR, the amount of fluorene-based vinyl terminal groups, the bending strength, and the lens moldability of the resin compositions obtained in Examples 1 to 1-2 were evaluated. The results are shown in Table 1. The amount of fluorene-based vinyl terminal groups was calculated by the method shown below.

(Method for Calculating Amount of Fluorene-Based Vinyl Terminal Groups)

The polycarbonate resins obtained in Examples 1 to 1-2 contain the following repeating unit.

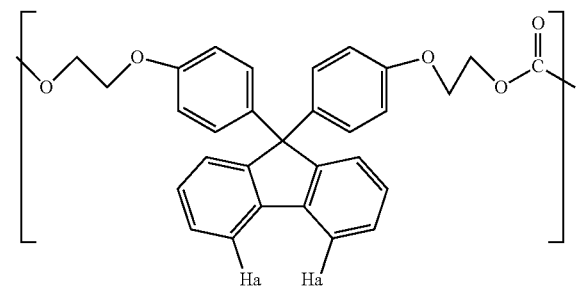

wherein Ha represents a hydrogen atom.

Further, the resin compositions contain a polymer and/or a compound described below.

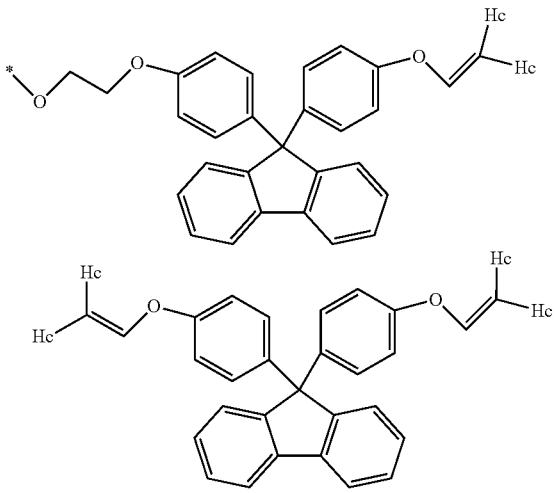

wherein * represents a polymer chain, and He represents a hydrogen atom.

The $^1$H-NMR spectrum of the resin compositions obtained in Examples 1 to 1-2 was measured, and the amount of fluorene-based vinyl terminal groups was calculated using the following expression:

Amount of fluorene-based vinyl terminal groups =

$$\frac{\text{Integral value of proton peaks corresponding to } Hc}{\text{Integral value of proton peaks corresponding to } Ha} \times 100$$

In the aforementioned expression, it can be considered as:

$$\frac{\text{Integral value of proton peaks corresponding to } Hc}{\text{Integral value of proton peaks corresponding to } Ha} = \frac{\text{Integral value of peaks at 4.75 to 4.69 ppm}}{\text{Integral value of peaks at 7.83 to 7.65 ppm}}.$$

$^1$H-NMR chart of the resin composition produced in Example 1 is shown in FIG. 1(a). FIGS. 1(b) and (c) are enlarged partial views of FIG. 1(a).

Example 2: Copolymer of BPEF and BHEBN; 240° C.

7.66 kg (20.45 mol) of 2,2'-bis(2-hydroxyethoxy)-1,1'-binaphthalene (hereinafter also referred to as "BHEBN"), 12.53 kg (28.58 mol) of BPEF, 10.80 kg (50.42 mol) of DPC, and $2.7 \times 10^{-2}$ g ($3.21 \times 10^{-4}$ mol) of sodium hydrogen carbonate were put into a 50-liter reactor equipped with a stirrer and a distillation apparatus. After conducting nitrogen purging, the temperature was raised to 205° C. over 20 minutes in a nitrogen atmosphere of 760 Torr. Thereafter, the raw materials were melted while the pressure was reduced to 700 Torr over 10 minutes. The mixture was held for 10 minutes as it was, followed by stirring, and was further held for 100 minutes, and thereafter the pressure was reduced to 205 Torr over 20 minutes. After the mixture was held for 60 minutes as it was, the pressure was adjusted to 180 Torr over 10 minutes, and the mixture was held for 20 minutes under conditions of 215° C. and 180 Torr. The pressure was adjusted to 150 Torr further over 10 minutes, and the mixture was held for 30 minutes under conditions of 230° C. and 140 Torr. Thereafter, the pressure was reduced to 120 Torr, and the temperature was raised to 240° C. Thereafter, the pressure was reduced to 100 Torr over 10 minutes, and the mixture was held for 10 minutes. The pressure was reduced to 1 Torr or less further over 50 minutes, and the mixture was held for 40 minutes under conditions of 240° C. and 1 Torr or less. After the completion of the reaction, nitrogen was blown into the reactor for pressurization, and the produced polycarbonate resin composition was taken out while being pelletized.

Example 2-1: Copolymer of BPEF and BHEBN; 260° C.

The procedure was performed in the same manner as in Example 2, to the step of melting the raw materials under reduced pressure. The mixture was held for 10 minutes as it was, followed by stirring, and was further held for 100 minutes, and thereafter the pressure was reduced to 205 Torr over 20 minutes. After the mixture was held for 60 minutes as it was, the pressure was adjusted to 180 Torr over 10 minutes, and the mixture was held for 20 minutes under conditions of 215° C. and 180 Torr. The pressure was adjusted to 150 Torr further over 10 minutes, and the mixture was held for 30 minutes under conditions of 230° C. and 140 Torr. Thereafter, the pressure was reduced to 120 Torr, and the temperature was raised to 260° C. Thereafter, the pressure was reduced to 100 Torr over 10 minutes, and the mixture was held for 10 minutes. The pressure was reduced to 1 Torr or less further over 50 minutes, and the mixture was held for 40 minutes under conditions of 260° C. and 1 Torr or less. After the completion of the reaction, nitrogen was blown into the reactor for pressurization, and the produced polycarbonate resin composition was taken out while being pelletized.

The MVR, the amount of fluorene-based vinyl terminal groups, the amount of binaphthol-based vinyl terminal groups, the bending strength, and the lens moldability of the resin compositions obtained in Examples 2 and 2-1 were evaluated. The results are shown in Table 1. The amount of fluorene-based vinyl terminal groups and the amount of binaphthol-based vinyl terminal groups were calculated by the methods shown below.

(Method for Calculating Amount of Fluorene-Based Vinyl Terminal Groups)

The polycarbonate resins obtained in Examples 2 and 2-1 contain the following repeating units.

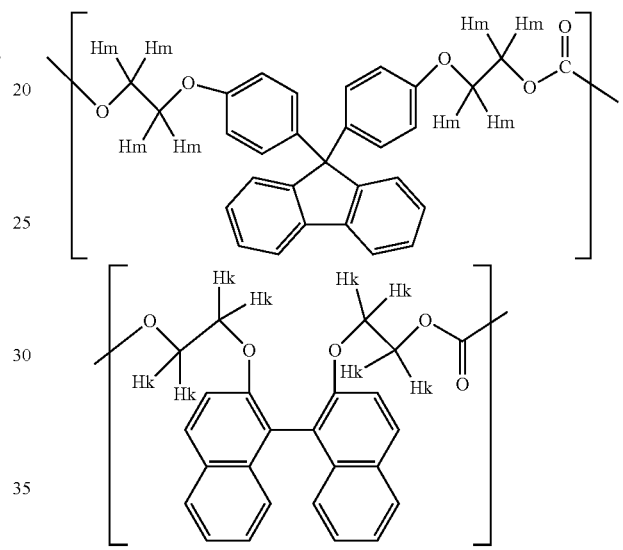

wherein Hm and Hk each represent a hydrogen atom.

Further, the resin compositions contain a polymer and/or a compound described below.

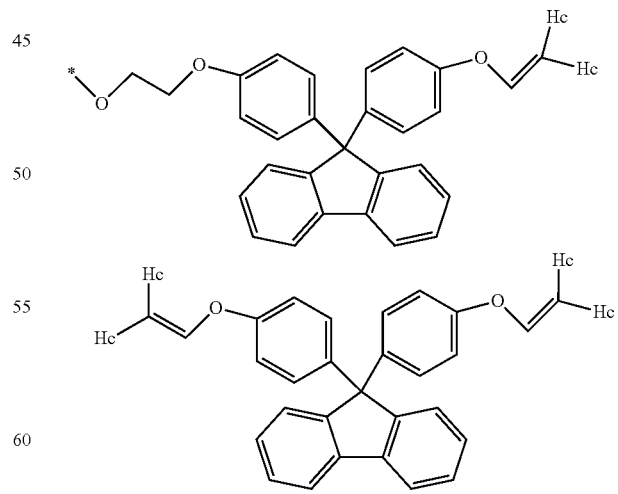

wherein * represents a polymer chain, and He represents a hydrogen atom.

The $^1$H-NMR spectrum of the resin compositions obtained in Examples 2 and 2-1 was measured, and the amount of fluorene-based vinyl terminal groups was calculated using the following expression:

Amount of fluorene-based vinyl terminal groups =

$$\frac{\text{Integral value of proton peaks corresponding to } Hc}{\text{Integral value of proton peaks corresponding to } Hm \text{ and } Hk} \times 100.$$

In the aforementioned expression, it can be considered as:

$$\frac{\text{Integral value of proton peaks corresponding to } Hc}{\substack{\text{Integral value of proton peaks corresponding}\\ \text{to } Hc, Hm \text{ and } Hk}} =$$

$$\frac{\text{Integral value of peaks at 4.75 to 4.69 ppm}}{\text{Integral value of peaks at 4.80 to 2.80 ppm}}.$$

(Method for Calculating Amount of Binaphthol-Based Vinyl Terminal Groups)

The resin compositions obtained in Examples 2 and 2-1 also contain a polymer and/or a compound described below, other than the components described above in "Method for calculating amount of fluorene-based vinyl terminal groups".

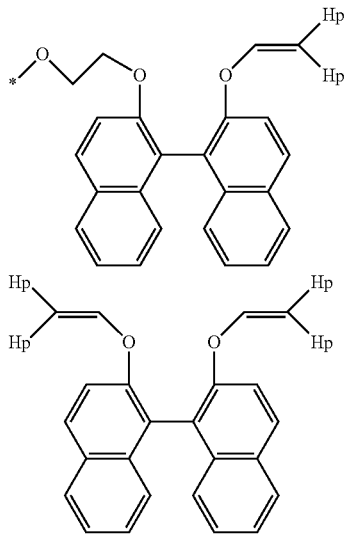

wherein * represents a polymer chain, and Hp represents a hydrogen atom.

Based on the $^1$H-NMR spectrum of the resin compositions obtained in Examples 2 and 2-1, the amount of binaphthol-based vinyl terminal groups was calculated using the following expression:

Amount of binaphthol-based vinyl terminal groups =

$$\frac{\text{Integral value of proton peaks corresponding to } Hp}{\text{Integral value of proton peaks corresponding to } Hm \text{ and } Hk} \times 100.$$

In the aforementioned expression, it can be considered as:

$$\frac{\text{Integral value of proton peaks corresponding to } Hp}{\substack{\text{Integral value of proton peaks}\\ \text{corresponding to } Hp, Hm \text{ and } Hk}} =$$

$$\frac{\text{Integral value of peaks at 4.69 to 4.59 ppm}}{\text{Integral value of peaks at 4.80 to 2.80 ppm}}.$$

$^1$H-NMR chart of a resin composition produced in Example 2 is shown in FIG. 2(a). FIG. 2(b) is an enlarged partial view of FIG. 2(a).

Example 3: Copolymer of BPPEF and BHEBN; 240° C.

A polycarbonate resin composition was obtained by performing the same operation as in Example 2, except that 7.42 kg (19.83 mol) of BHEBN, 14.68 kg (24.85 mol) of 9,9-bis(4-(2-hydroxyethoxy)-3-phenylphenyl)fluorene (hereinafter also referred to as "BPPEF"), 9.70 kg (45.30 mol) of DPC, and 2.25×10$^{-2}$ g (2.98×10$^{-4}$ mol) of sodium hydrogen carbonate were used as raw materials.

Example 3-1: Copolymer of BPPEF and BHEBN; 260° C.

A polycarbonate resin composition was obtained by performing the same operation as in Example 2-1, except that 7.42 kg (19.83 mol) of BHEBN, 14.68 kg (24.85 mol) of 9,9-bis(4-(2-hydroxyethoxy)-3-phenylphenyl)fluorene (hereinafter also referred to as "BPPEF"), 9.70 kg (45.30 mol) of DPC, and 2.25×10$^{-2}$ g (2.98×10$^{-4}$ mol) of sodium hydrogen carbonate were used as raw materials.

Example 3-2: Copolymer of BPPEF and BHEBN; 280° C.

The procedure was performed in the same manner as in Example 3-1, to the step of melting the raw materials under reduced pressure. The mixture was held for 10 minutes as it was, followed by stirring, and was further held for 100 minutes, and thereafter the pressure was reduced to 205 Torr over 20 minutes. After the mixture was held for 60 minutes as it was, the pressure was adjusted to 180 Torr over 10 minutes, and the mixture was held for 20 minutes under conditions of 215° C. and 180 Torr. The pressure was adjusted to 150 Torr further over 10 minutes, and the mixture was held for 30 minutes under conditions of 230° C. and 140 Torr. Thereafter, the pressure was reduced to 120 Torr, and the temperature was raised to 280° C. Thereafter, the pressure was reduced to 100 Torr over 10 minutes, and the mixture was held for 10 minutes. The pressure was reduced to 1 Torr or less further over 50 minutes, and the mixture was held for 40 minutes under conditions of 280° C. and 1 Torr or less. After the completion of the reaction, nitrogen was blown into the reactor for pressurization, and the produced polycarbonate resin composition was taken out while being pelletized.

The MVR, the amount of fluorene-based vinyl terminal groups, the amount of binaphthol-based vinyl terminal groups, the bending strength, and the lens moldability of the resin compositions obtained in Examples 3 to 3-2 were evaluated. The results are shown in Table 1. The amount of fluorene-based vinyl terminal groups and the amount of binaphthol-based vinyl terminal groups were calculated by the methods shown below.

(Method for Calculating Amount of Fluorene-Based Vinyl Terminal Groups)

The polycarbonate resins obtained in Examples 3 to 3-2 contain the following repeating units.

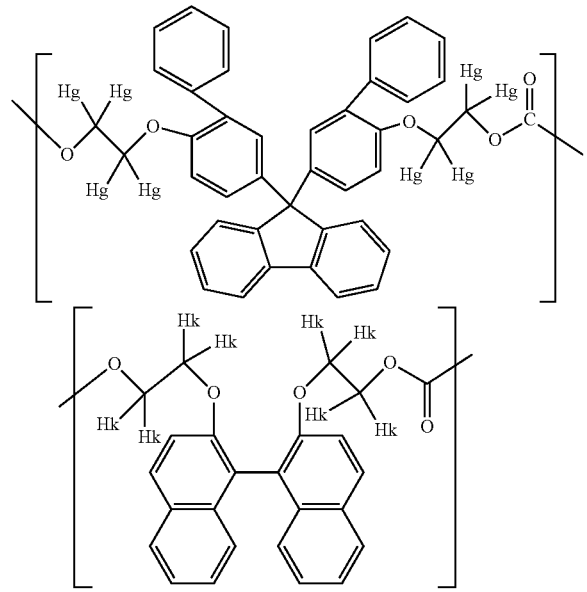

wherein Hg and Hk each represent a hydrogen atom.

Further, the resin compositions contain a polymer and/or a compound described below.

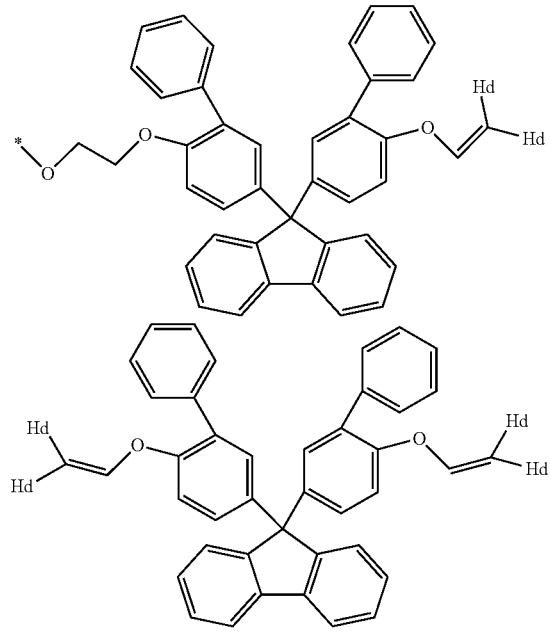

wherein * represents a polymer chain, and Hd represents a hydrogen atom.

The $^1$H-NMR spectrum of the resin compositions obtained in Examples 3 to 3-2 was measured, and the amount of fluorene-based vinyl terminal groups was calculated using the following expression:

$$\text{Amount of fluorene-based vinyl terminal groups} = \frac{\text{Integral value of proton peaks corresponding to } Hd}{\text{Integral value of proton peaks corresponding to } Hg \text{ and } Hk} \times 100.$$

In the aforementioned expression, it can be considered as:

$$\frac{\text{Integral value of proton peaks corresponding to } Hd}{\text{Integral value of proton peaks corresponding to } Hd, Hg \text{ and } Hk} = \frac{\text{Integral value of peaks at 4.59 to 4.55 ppm}}{\text{Integral value of peaks at 4.80 to 2.80 ppm}}.$$

(Method for Calculating Amount of Binaphthol-Based Vinyl Terminal Groups)

The resin compositions obtained in Examples 3 to 3-2 also contain a polymer and/or a compound described below, other than the components described above in "Method for calculating amount of fluorene-based vinyl terminal groups".

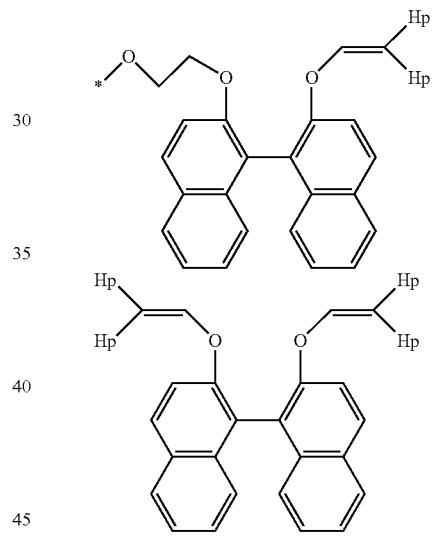

wherein * represents a polymer chain, and Hp represents a hydrogen atom.

Based on the $^1$H-NMR spectrum of the resin compositions obtained in Examples 3 to 3-2, the amount of binaphthol-based vinyl terminal groups was calculated using the following expression:

$$\text{Amount of binaphthol-based vinyl terminal groups} = \frac{\text{Integral value of proton peaks corresponding to } Hp}{\text{Intergral value of proton peaks corresponding to } Hg \text{ and } Hk} \times 100.$$

In the aforementioned expression, it can be considered as:

$$\frac{\text{Integral value of proton peaks corresponding to } Hp}{\text{Integral value of proton peaks corresponding to } Hd, Hg \text{ and } Hk} =$$

$$\frac{\text{Integral value of peaks at 4.69 to 4.59 ppm}}{\text{Integral value of peaks at 4.80 to 2.80 ppm}}.$$

¹H-NMR chart of the resin composition produced in Example 3 is shown in FIG. 3(a). FIG. 3(b) is an enlarged partial view of FIG. 3(a).

Example 4: Copolymer of BPEF and Bisphenol A; 240° C.

15.80 kg (36.03 mol) of BPEF, 1.30 kg (5.69 mol) of 2,2-bis(4-hydroxyphenyl)propane (hereinafter also referred to as "bisphenol A"), 9.31 kg (43.45 mol) of DPC, and 2.10×10⁻² g (2.50×10⁻⁴ mol) of sodium hydrogen carbonate were put into a 50-liter reactor equipped with a stirrer and a distillation apparatus. After conducting nitrogen purging, the mixture was stirred while being heated to 205° C. over 1 hour in a nitrogen atmosphere of 760 Torr. After the complete dissolution of the raw materials, the pressure reduction degree was adjusted to 150 Torr over 15 minutes, and the mixture was held for 20 minutes under conditions of 205° C. and 150 Torr, followed by transesterification reaction. Thereafter, the temperature was raised to 240° C. at a rate of 37.5° C./hr, and the mixture was held at 240° C. and 150 Torr for 10 minutes. Thereafter, the pressure was adjusted to 120 Torr over 10 minutes, and the mixture was held at 240° C. and 120 Torr for 70 minutes. Thereafter, the pressure was adjusted to 100 Torr over 10 minutes, and the mixture was held at 240° C. and 100 Torr for 10 minutes. Further, the conditions were changed to 1 Torr or less over 40 minutes, and polymerization reaction was performed under stirring for 10 minutes under conditions of 240° C. and 1 Torr or less. After the completion of the reaction, nitrogen was blown into the reactor for pressurization, and the produced polycarbonate resin composition was taken out while being pelletized:

Example 4-1: Copolymer of BPEF and Bisphenol A; 260° C.

Transesterification reaction was performed in the same manner as in Example 4. Thereafter, the temperature was raised to 240° C. at a rate of 37.5° C./hr, and the mixture was held at 240° C. and 150 Torr for 10 minutes. Thereafter, the pressure was adjusted to 120 Torr over 10 minutes, and the mixture was held at 240° C. and 120 Torr for 70 minutes. Thereafter, the pressure was adjusted to 100 Torr over 10 minutes, and the mixture was held at 240° C. and 100 Torr for 10 minutes. Further, the conditions were changed to 260° C. and 1 Torr or less over 40 minutes, and polymerization reaction was performed under stirring for 20 minutes under conditions of 260° C. and 1 Torr or less. After the completion of the reaction, nitrogen was blown into the reactor for pressurization, and the produced polycarbonate resin composition was taken out while being pelletized.

Example 4-2: Copolymer of BPEF and Bisphenol A; 280° C.

Transesterification reaction was performed in the same manner as in Example 4. Thereafter, the temperature was raised to 240° C. at a rate of 37.5° C./hr, and the mixture was held at 240° C. and 150 Torr for 10 minutes. Thereafter, the pressure was adjusted to 120 Torr over 10 minutes, and the mixture was held at 240° C. and 120 Torr for 70 minutes. Thereafter, the pressure was adjusted to 100 Torr over 10 minutes, and the mixture was held at 240° C. and 100 Torr for 10 minutes. Further, the conditions were changed to 280° C. and 1 Torr or less over 40 minutes, and polymerization reaction was performed under stirring for 30 minutes under conditions of 280° C. and 1 Torr or less. After the completion of the reaction, nitrogen was blown into the reactor for pressurization, and the produced polycarbonate resin composition was taken out while being pelletized.

The MVR, the amount of fluorene-based vinyl terminal groups, the bending strength, and the lens moldability of the resin compositions obtained in Examples 4 to 4-2 were evaluated. The results are shown in Table 1. The amount of fluorene-based vinyl terminal groups was calculated by the method shown below.

(Method for Calculating Amount of Fluorene-Based Vinyl Terminal Groups)

The polycarbonate resins obtained in Examples 4 to 4-2 contain the following repeating unit.

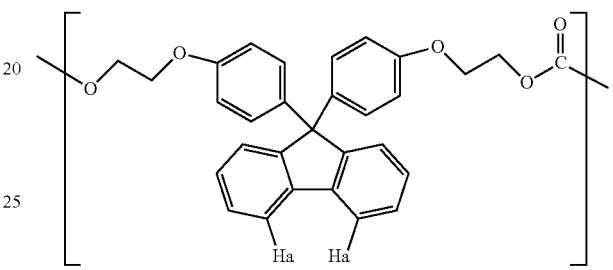

wherein Ha represents a hydrogen atom.

Further, the resin compositions contain a polymer and/or a compound described below.

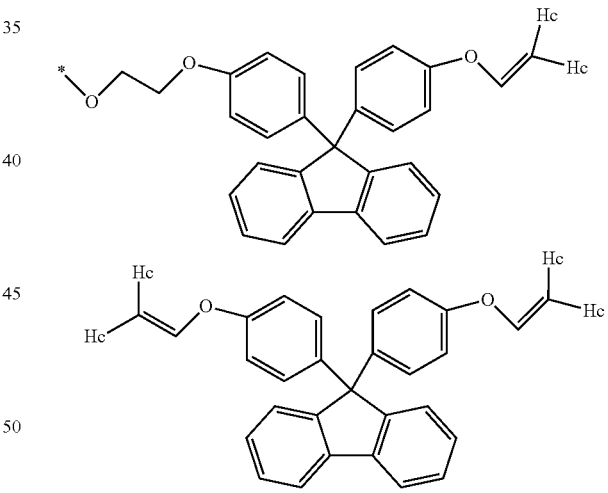

wherein * represents a polymer chain, and Hc represents a hydrogen atom.

The ¹H-NMR spectrum of the resin compositions obtained in Examples 4 to 4-2 was measured, and the amount of fluorene-based vinyl terminal groups was calculated using the following expression:

Amount of fluorene-based vinyl terminal groups =

$$\frac{\text{Integral value of proton peaks corresponding to } Hc}{\text{Integral value of proton peaks corresponding to } Ha} \times 100.$$

In the aforementioned expression, it can be considered as:

$$\frac{\text{Integral value of proton peaks corresponding to } Hc}{\text{Integral value of proton peaks corresponding to } Ha} =$$
$$\frac{\text{Integral value of peaks at 4.75 to 4.69 ppm}}{\text{Integral value of peaks at 7.83 to 7.65 ppm}}.$$

$^1$H-NMR chart of the resin composition produced in Example 4 is shown in FIG. 4(a). FIG. 4(b) is an enlarged partial view of FIG. 4(a).

Example 5: Copolymer of BPEF and BHEBN; 280° C.

7.66 kg (20.45 mol) of BHEBN, 12.50 kg (28.50 mol) of BPEF, 10.80 kg (50.42 mol) of DPC, and 1.78×10$^{-2}$ g (2.12×10$^{-4}$ mol) of sodium hydrogen carbonate were put into a 50-liter reactor equipped with a stirrer and a distillation apparatus. After conducting nitrogen purging, the temperature was raised to 205° C. over 20 minutes in a nitrogen atmosphere of 760 Torr. Thereafter, the raw materials were melted while the pressure was reduced to 700 Torr over 10 minutes. The mixture was held for 10 minutes as it was, followed by stirring, and was further held for 100 minutes, and thereafter the pressure was reduced to 205 Torr over 20 minutes. After the mixture was held for 60 minutes as it was, the pressure was adjusted to 180 Torr over 10 minutes, and the mixture was held for 20 minutes under conditions of 215° C. and 180 Torr. The pressure was adjusted to 150 Torr further over 10 minutes, and the mixture was held for 30 minutes under conditions of 240° C. and 150 Torr. Further, the pressure was reduced to 120 Torr over 10 minutes, the mixture was held for 30 minutes, as it was, and thereafter the temperature was raised to 280° C. over 40 minutes. Thereafter, the pressure was reduced to 100 Torr over 10 minutes, and the mixture was held for 10 minutes. The pressure was reduced to 1 Torr or less further over 50 minutes, and the mixture was held for 40 minutes under conditions of 280° C. and 1 Torr or less. After the completion of the reaction, nitrogen was blown into the reactor for pressurization, and the produced polycarbonate resin composition was taken out while being pelletized.

The MVR of the resin composition thus obtained was 32 cm/10 min, the amount of fluorene-based vinyl terminal groups was 0.625, the amount of binaphthol-based vinyl terminal groups was 0.813, and the bending strength was 85 MPa. The amount of fluorene-based vinyl terminal groups and the amount of binaphthol-based vinyl terminal groups were calculated in the same manner as in Example 2.

$^1$H-NMR chart of the resin composition produced in Example 5 is shown in FIG. 5(a). FIG. 5(b) is an enlarged partial view of FIG. 5(a).

Comparative Example 1: BPEF Homopolymer, 230° C.

15.50 kg (35.35 mol) of BPEF, 7.89 kg (36.82 mol) of DPC, and 1.78×10$^{-2}$ g (2.12×10$^{-4}$ mol) of sodium hydrogen carbonate were put into a 50-liter reactor equipped with a stirrer and a distillation apparatus. After conducting nitrogen purging, the mixture was stirred while being heated to 205° C. over 1 hour in a nitrogen atmosphere of 760 Torr. After the complete dissolution of the raw materials, the pressure reduction degree was adjusted to 150 Torr over 15 minutes, and the mixture was held for 20 minutes under conditions of 205° C. and 150 Torr, followed by transesterification reaction. Thereafter, the temperature was raised to 230° C. at a rate of 37.5° C./hr, and the mixture was held for 10 minutes at 230° C. and 150 Torr. Thereafter, the pressure was adjusted to 120 Torr over 10 minutes, and the mixture was held for 70 minutes at 230° C. and 120 Torr. Thereafter, the pressure was adjusted to 100 Torr over 10 minutes, and the mixture was held at 230° C. and 100 Torr for 10 minutes. Further, the pressure was reduced to 1 Torr or less over 40 minutes, and polymerization reaction was performed under stirring for 10 minutes under conditions of 230° C. and 1 Torr or less. After the completion of the reaction, nitrogen was blown into the reactor for pressurization, and the produced polycarbonate resin was taken out while being pelletized.

Comparative Example 1-1: BPEF Homopolymer, 300° C.

Transesterification reaction was performed in the same manner as in Comparative Example 1. Thereafter, the temperature was raised to 230° C. at a rate of 37.5° C./hr, and the mixture was held at 230° C. and 150 Torr for 10 minutes. Thereafter, the pressure was adjusted to 120 Torr over 10 minutes, and the mixture was held at 230° C. and 120 Torr for 70 minutes. Thereafter, the pressure was adjusted to 100 Torr over 10 minutes, and the mixture was held at 300° C. and 100 Torr for 10 minutes. Further, the pressure was reduced to 1 Torr or less over 40 minutes, and polymerization reaction was performed under stirring for 10 minutes under conditions of 300° C. and 1 Torr or less. After the completion of the reaction, nitrogen was blown into the reactor for pressurization, and the produced polycarbonate resin was taken out while being pelletized.

The MVR, the amount of fluorene-based vinyl terminal groups, the bending strength, and the lens moldability of the resin compositions obtained in Comparative Examples 1 and 1-1 were evaluated. The results are shown in Table 1. The amount of fluorene-based vinyl terminal groups was calculated in the same manner as in Example 1.

$^1$H-NMR chart of the resin composition produced in Comparative Example 1 is shown in FIG. 6(a). FIG. 6(b) is an enlarged partial view of FIG. 6(a).

Comparative Example 2: Copolymer of BPEF and BHEBN; 230° C.

7.66 kg (20.46 mol) of BHEBN, 12.50 kg (28.51 mol) of BPEF, 10.80 kg (50.42 mol) of DPC, and 1.78×10$^{-2}$ g (2.12×10$^{-4}$ mol) of sodium hydrogen carbonate were put into a 50-liter reactor equipped with a stirrer and a distillation apparatus. After conducting nitrogen purging, the temperature was raised to 205° C. over 20 minutes in a nitrogen atmosphere of 760 Torr. Thereafter, the raw materials were melted while the pressure was reduced to 700 Torr over 10 minutes. The mixture was held for 10 minutes as it was, followed by stirring, and was further held for 100 minutes, and thereafter the pressure was reduced to 205 Torr over 20 minutes. After the mixture was held for 60 minutes as it was, the pressure was adjusted to 180 Torr over 10 minutes, and the mixture was held for 20 minutes under conditions of 215° C. and 180 Torr. The pressure was adjusted to 150 Torr further over 10 minutes, and the mixture was held for 30 minutes under conditions of 240° C. and 150 Torr, and thereafter the pressure was reduced to 120 Torr over 10 minutes. After the mixture was held for 30 minutes as it was, and the temperature was raised to 230° C. over 30 minutes. Thereafter, the pressure was reduced to 100 Torr over 10 minutes, and the mixture was held for 10 minutes. The pressure was reduced to 1 Torr or less further over 50 minutes, and the mixture was held for 40 minutes under conditions of 230° C. and 1 Torr or less. After the completion of the reaction, nitrogen was blown into the reactor for pressurization, and the produced polycarbonate resin composition was taken out while being pelletized.

Comparative Example 2-1: Copolymer of BPEF and BHEBN; 300° C.

The procedure was performed in the same manner as in Comparative Example 2, to the step of melting the raw materials under reduced pressure. The mixture was held for 10 minutes as it was, followed by stirring, and was further held for 100 minutes, and thereafter the pressure was reduced to 205 Torr over 20 minutes. After the mixture was held for 60 minutes as it was, the pressure was adjusted to 180 Torr over 10 minutes, and the mixture was held for 20 minutes under conditions of 215° C. and 180 Torr. The pressure was adjusted to 150 Torr further over 10 minutes, the mixture was held for 30 minutes under conditions of 240° C. and 150 Torr, and thereafter the pressure was reduced to 120 Torr over 10 minutes. After the mixture was held for 30 minutes as it was, and the temperature was raised to 300° C. over 50 minutes. Thereafter, the pressure was reduced to 100 Torr over 10 minutes, and the mixture was held for 10 minutes. The pressure was reduced to 1 Torr or less further over 50 minutes, and the mixture was held for 50 minutes under conditions of 300° C. and 1 Torr or less. After the completion of the reaction, nitrogen was blown into the reactor for pressurization, and the produced polycarbonate resin composition was taken out while being pelletized.

The MVR, the amount of fluorene-based vinyl terminal groups, the amount of binaphthol-based vinyl terminal groups, the bending strength, and the lens moldability of the resin compositions obtained in Comparative Examples 2 and 2-1 were evaluated. The results are shown in Table 1. The amount of fluorene-based vinyl terminal groups and the amount of binaphthol-based vinyl terminal groups were calculated in the same manner as in Example 2.

$^1$H-NMR chart of the resin composition produced in Comparative Example 2 is shown in FIG. 7(a). FIG. 7(b) is an enlarged partial view of FIG. 7(a).

Comparative Example 3: Copolymer of BPPEF and BHEBN; 300° C.

The procedure was performed in the same manner as in Example 3-1, to the step of melting the raw materials under reduced pressure. The mixture was held for 10 minutes as it was, followed by stirring, and was further held for 100 minutes, and thereafter the pressure was reduced to 205 Torr over 20 minutes. After the mixture was held for 60 minutes as it was, the pressure was adjusted to 180 Torr over 10 minutes, and the mixture was held for 20 minutes under conditions of 215° C. and 180 Torr. The pressure was adjusted to 150 Torr further over 10 minutes, and the mixture was held for 30 minutes under conditions of 230° C. and 140 Torr. Thereafter, the pressure was reduced to 120 Torr, and the temperature was raised to 300° C. Thereafter, the pressure was reduced to 100 Torr over 10 minutes, and the mixture was held for 10 minutes. The pressure was reduced to 1 Torr or less further over 50 minutes, and the mixture was held for 50 minutes under conditions of 300° C. and 1 Torr or less. After the completion of the reaction, nitrogen was blown into the reactor for pressurization, and the produced polycarbonate resin composition was taken out while being pelletized.

The MVR, the amount of fluorene-based vinyl terminal groups, the amount of binaphthol-based vinyl terminal groups, the bending strength, and the lens moldability of the resin composition obtained in Comparative Example 3 were evaluated. The results are shown in Table 1. The amount of fluorene-based vinyl terminal groups and the amount of binaphthol-based vinyl terminal groups were calculated in the same manner as in Example 3.

Table 1 below summarizes the values of the amount of fluorene-based vinyl terminal groups and/or the amount of binaphthol-based vinyl terminal groups calculated in Examples and Comparative Examples above, and the MVR, the bending strength, and the lens moldability as measured therein.

TABLE 1

| | MVR cm$^3$/10 min | Amount of fluorene-based vinyl terminal groups | Amount of binaphthol-based vinyl terminal groups | Bending strength MPa | Lens moldability 1 | Lens moldability 2 |
|---|---|---|---|---|---|---|
| Example 1 | 30 | 0.187 | — | 102 | A | Good |
| Example 1-1 | 29 | 0.501 | — | 100 | A | Good |
| Example 1-2 | 28 | 0.752 | — | 96 | A | Good |
| Example 2 | 32 | 0.091 | 0.442 | 100 | A | Good |
| Example 2-1 | 31 | 0.321 | 0.622 | 94 | A | Good |
| Example 3 | 32 | 0.031 | 0.375 | 97 | A | Good |
| Example 3-1 | 31 | 0.302 | 0.456 | 93 | A | Good |
| Example 3-2 | 30 | 0.803 | 0.933 | 87 | A | Good |
| Example 4 | 30 | 0.100 | — | 100 | A | Good |
| Example 4-1 | 30 | 0.300 | — | 101 | A | Good |
| Examale 4-2 | 30 | 0.832 | — | 85 | A | Good |
| Example 5 | 32 | 0.625 | 0.813 | 85 | A | Good |
| Comparative Example 1 | 29 | 0.009 | — | 79 | C | Slightly poor |
| Comparative Example 1-1 | 29 | 1.222 | — | 78 | B | Poor |
| Comparative Example 2 | 29 | 0.009 | 0.044 | 78 | C | Poor |
| Comparative Example 2-1 | 29 | 1.125 | 1.375 | 75 | B | Poor |
| Comparative Example 3 | 32 | 1.057 | 1.528 | 76 | B | Poor |

It turns out from Table 1 that the resin composition of the present invention has excellent fluidity (MVR) and excellent bending strength.

2. Film

Using the resin compositions produced above, films were produced. The obtained films were evaluated by the methods shown below.

(1) Total Light Transmittance and Haze

The total light transmittance and haze were measured using a haze meter ("HM-150" manufactured by MURAKAMI COLOR RESEARCH LABORATORY) according to JIS K-7361 and JIS K-7136.

(2) Glass Transition Temperature

The measurement was performed using a differential thermal scanning calorimeter (DSC) (measurement device: Hitachi High-Tech Science Corporation DSC7000X).

(3) Surface Shape

The surface shapes of the light diffusing films were evaluated based on the arithmetic average roughness. The arithmetic average roughness was calculated as follows, by plotting a roughness curve using a small surface roughness meter ("Surftest SJ-210" manufactured by Mitutoyo Corporation). From the plotted roughness curve, the range of the reference length (1) (average line direction) was extracted. When the average line direction of the extracted portion serves as the X axis, the direction orthogonal to the X axis serves as the Y axis, and the roughness curve is expressed as y=f(x), a value (μm) obtained by the following expression was taken as arithmetic average roughness (Ra). Here, the "reference length (1) (average line direction)" indicates the reference length of roughness parameters based on JIS B 0601:2001 (ISO 4287:1997).

$$Ra = \frac{1}{l} \int_0^l |f(x)| dx$$

(5) Refractive Index

Films having a thickness of 0.1 mm were measured using an Abbe refractometer according to the method of JIS-K-7142 (at a wavelength of 589 nm at 23° C.).

(6) Abbe Number (ν)

The refractive index of a film having a thickness of 0.1 mm was measured using an Abbe refractometer at a wavelength of 486 nm, 589 nm, and 656 nm, at 23° C., and further the Abbe number was calculated using the following expression.

$$\nu = (nD-1)/(nF-nC)$$

nD: Refractive index at a wavelength of 589 nm
nC: Refractive index at a wavelength of 656 nm
nF: Refractive index at a wavelength of 486 nm (7) Melt Volume Rate (MVR)

The MVR is an index indicating the fluidity of the resin compositions, and a larger value indicates a higher fluidity. The resin compositions produced in Examples were dried at 120° C. under vacuum for 4 hours, and the measurement was performed using a melt indexer T-111, manufactured by Toyo Seiki Seisaku-sho, Ltd., under conditions of a temperature of 260° C. and a loading of 2160 g.

Example 6

Pellets of the resin composition produced in Example 2 were melt-extruded at 280° C. using a 26-mm twin screw-extruder and a T-die. The extruded molten film was nipped with a first cooling roll having a diameter of 200 mm and made of silicon rubber and a matted (arithmetic average surface roughness: 3.2 μm) second cooling roll having a diameter of 200 mm and made of metal. The matte pattern was shaped on the film surface, followed by cooling, and further the film was passed on a third cooling roll having a mirror surface structure and made of metal, so that a single sided matte film was formed while being taken up with a take-up roll. At this time, the arithmetic average roughness of the film surface was adjusted to 3.0 μm by setting the temperature of the first cooling roll to 40° C., the temperature of the second cooling roll to 130° C., and the temperature of the third cooling roll to 130° C., and adjusting the speed of the cooling rolls.

Example 7

Pellets of the resin composition produced in Example 4 were melt-extruded at 260° C. using a 26-mm twin-screw extruder and a T-die. The extruded molten film was nipped with a first cooling roll having a diameter of 200 mm and made of silicon rubber and a matted (arithmetic average surface roughness: 2.5 μm) second cooling roll having a diameter of 200 mm and made of metal. The matte pattern was shaped on the film surface, followed by cooling, and further the film was passed on the third cooling roll having a mirror surface structure and made of metal, so that a single sided matte film was formed while being taken up with a take-up roll. At this time, the temperature of the first cooling roll was set to 40° C., the temperature of the second cooling roll was set to 130° C., the temperature of the third cooling roll was set to 130° C., and the speed of cooling rolls was set to 3.0 m/min.

Comparative Example 4

Using pellets of a polycarbonate resin (EUPILON H-4000, manufactured by Mitsubishi Engineering-Plastics Corporation), a film was produced in the same manner as in Example 6.

The evaluation results for the films obtained in Examples 6 and 7 and Comparative Example 4 are shown in Table 2.

TABLE 2

|  | Example 6 | Example 7 | Comparative Example 4 |
|---|---|---|---|
| Film thickness (μm) | 220 | 230 | 250 |
| Haze (%) | 88.6 | 87 | 76 |
| Total light transmittance (%) | 86.1 | 87.6 | 89.1 |
| Arithmetic average roughness (μm) | 3 | 2.9 | 1.8 |
| Glass transition temperature (° C.) | 134 | 145 | 142 |
| MVR 260° C. cm³/10 min | 32 | 30 | 33 |
| Abbe number | 21.5 | 23.9 | 30.1 |
| Refractive index | 1.651 | 1.636 | 1.584 |

The films of the present invention exhibit high haze and high arithmetic average roughness while maintaining the total light transmittance required for optical films. This means that the films of the present invention have excellent transferability, that is, excellent shapability. Further, it also turns out that the films of the present invention are excellent in evaluation of the Abbe number, the refractive index, and the like, that are required as basic properties of optical materials. Further, the films of the present invention have small values of the birefringence phase difference. This means that the difference in birefringence between the center and the ends of the films is small, and the films are more uniform.

Although the reason why the films of the present invention have excellent properties as above is not clear, it is considered that the fluorene groups and the binaphthalene groups present in the resin compositions of the present invention contribute to the improvement of the optical properties and the shapability of the films. Further, it is considered that, since a compound having a vinyl group at its terminal is contained in the resin compositions of the present invention, the resins have flexibility during forming, and the shapability of the films is more improved.

It should be understood that some embodiments of the invention described herein are intended for purposes of illustration only and are not intended to limit the scope of the invention. These novel embodiments can be embodied in various other forms, and various omissions, replacements, and changes can be made without departing from the scope of the invention. These embodiments and their modifications would fall within the scope and spirit of the invention and are included in the invention described in the appended claims and their equivalents.

The invention claimed is:

1. A resin composition comprising:
a resin containing a repeating unit derived from a compound represented by formula (1) below (but excluding a polymer having a terminal structure represented by formula (A) below):

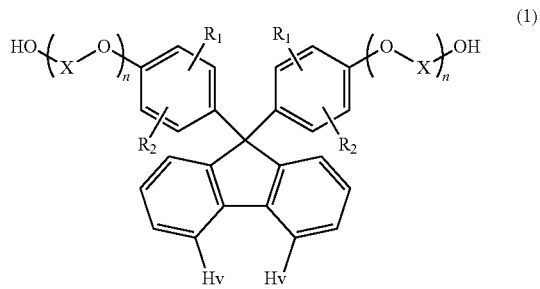
(1)

and
the polymer having the terminal structure represented by formula (A) below and/or a compound represented by formula (B) below:

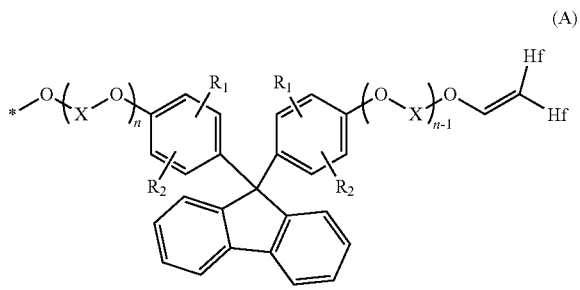
(A)

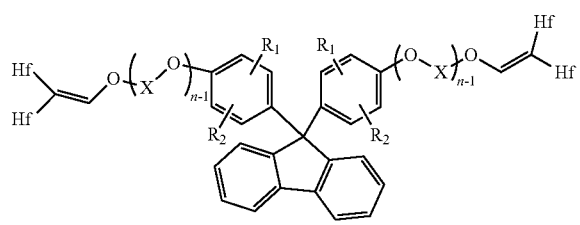
(B)

wherein in formulas (1), (A), and (B),
$R_1$ and $R_2$ are each independently selected from a hydrogen atom, an alkyl group having 1 to 20 carbon atoms, an alkoxyl group having 1 to 20 carbon atoms, a cycloalkyl group having 5 to 20 carbon atoms, a cycloalkoxyl group having 5 to 20 carbon atoms, an aryl group having 6 to 20 carbon atoms, an aryloxy group having 6 to 20 carbon atoms, and a halogen atom;
each X is independently an optionally branched alkylene group having 2 to 6 carbon atoms;
Hv and Hf are each a hydrogen atom;
each n is independently an integer of 1 to 5; and
* is a polymer chain,
wherein a $^1$H-NMR spectrum of the resin composition satisfies a relationship of:

$$\frac{\text{Integral value of proton peaks corresponding to } Hf \text{ in formulas } (A) \text{ and } (B)}{\text{Integral value of proton peaks corresponding to } Hv \text{ in formulas } (1)} \times 100 = 0.01 \text{ to } 1.0.$$

2. The resin composition according to claim 1, wherein the resin containing the repeating unit derived from the compound represented by formula (1) is a resin consisting of the repeating unit derived from the compound represented by formula (1).

3. The resin composition according to claim 1, wherein the resin further contains a repeating unit derived from a compound represented by formula (2) below:

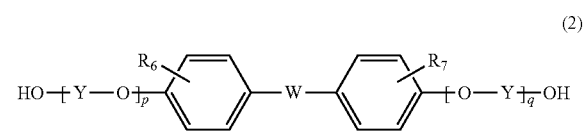
(2)

wherein
$R_6$ and $R_7$ are each independently selected from a hydrogen atom, an alkyl group having 1 to 20 carbon atoms, an alkoxyl group having 1 to 20 carbon atoms, a cycloalkyl group having 5 to 20 carbon atoms, a cycloalkoxyl group having 5 to 20 carbon atoms, an aryl group having 6 to 20 carbon atoms, an aryloxy group having 6 to 20 carbon atoms, and a halogen atom;
each Y is independently an optionally branched alkylene group having 2 to 6 carbon atoms, a cycloalkylene group having 6 to 10 carbon atoms, or an arylene group having 6 to 10 carbon atoms;
W is a single bond or selected from the group consisting of:

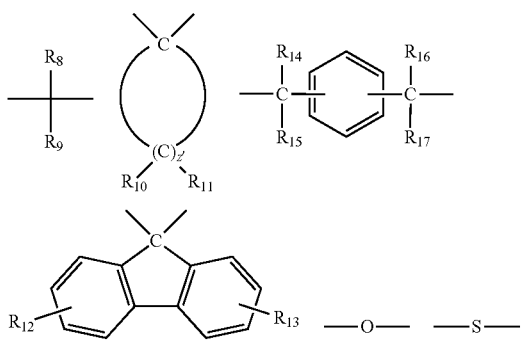
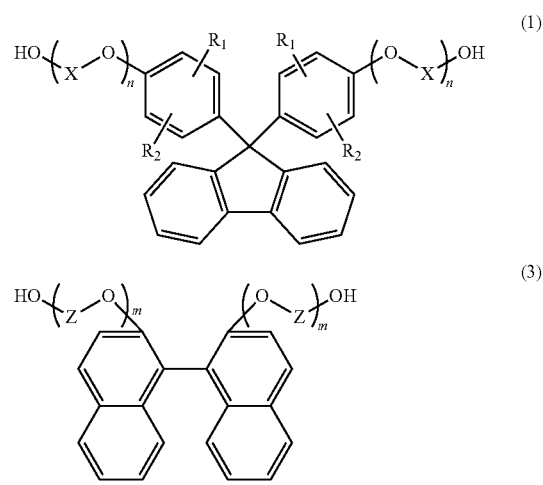

wherein $R_8$, $R_9$, and $R_{14}$ to $R_{17}$ are each independently selected from a hydrogen atom, an alkyl group having 1 to 10 carbon atoms, and a phenyl group having 6 to 10 carbon atoms; $R_{10}$ and $R_{11}$ are each independently selected from a hydrogen atom and an alkyl group having 1 to 5 carbon atoms; $R_{12}$ and $R_{13}$ are each independently selected from a hydrogen atom, an alkyl group having 1 to 5 carbon atoms, and a phenyl group; and $Z'$ is an integer of 3 to 11;

and p and q are each independently an integer of 0 to 5.

4. The resin composition according to claim 3, wherein p and q are 0, and W is:

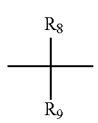

5. The resin composition according to claim 3, wherein the compound represented by formula (2) is bisphenol A.

6. The resin composition according to claim 3, wherein a molar ratio of the repeating unit derived from the compound represented by formula (1) to the repeating unit derived from the compound represented by formula (2) in the resin is 20:80 to 99:1.

7. The resin composition according to claim 1, wherein the $^1$H-NMR spectrum of the resin composition satisfies a relationship of:

$$\frac{\text{Integral value of proton peaks corresponding to } Hf \text{ in formulas } (A) \text{ and } (B)}{\text{Integral value of proton peaks corresponding to } Hv \text{ in formula } (1)} \times 100 =$$

$$\frac{\text{Integral value of peaks at 4.75 to 4.69 ppm}}{\text{Integral value of peaks at 7.83 to 7.65 ppm}} \times 100 = 0.01 \text{ to } 1.00.$$

8. A resin composition comprising:

a resin containing a repeating unit derived from a compound represented by formula (1) below and a repeating unit represented by formula (3) below (but excluding a polymer having a terminal structure represented by formula (A) below and a polymer having a terminal structure represented by formula (C) below):

the polymer having the terminal structure represented by formula (A) below, a compound represented by formula (B) below, the polymer having the terminal structure represented by formula (C) below, and/or a compound represented by formula (D) below:

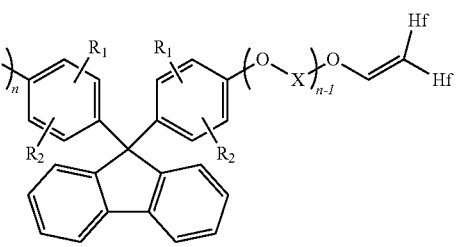

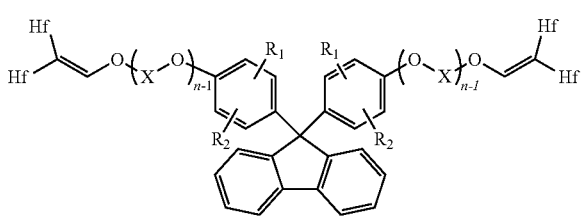

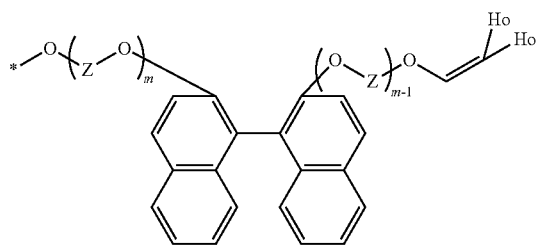

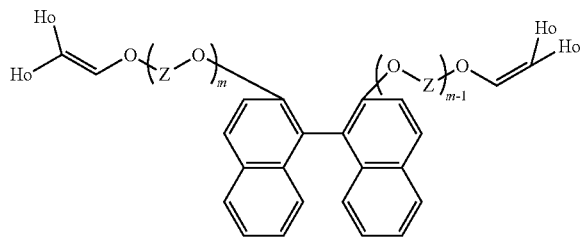

wherein in formulas (1), (3), (A), (B), (C), and (D),
$R_1$ and $R_2$ are each independently selected from a hydrogen atom, an alkyl group having 1 to 20 carbon atoms, an alkoxyl group having 1 to 20 carbon atoms, a cycloalkyl group having 5 to 20 carbon atoms, a cycloalkoxyl group having 5 to 20 carbon atoms, an aryl group having 6 to 20 carbon atoms, an aryloxy group having 6 to 20 carbon atoms, and a halogen atom;
X and Z are each independently an optionally branched alkylene group having 2 to 6 carbon atoms;
n and m are each independently an integer of 1 to 5;
Hf and Ho are each a hydrogen atom; and
each * is independently a polymer chain,
wherein a $^1$H-NMR spectrum of the resin composition satisfies a relationship of:

$$\frac{\text{Integral value of peaks at 4.75 to 4.55 ppm}}{\text{Integral value of peaks at 4.80 to 2.80 ppm}} \times 100 = 0.01 \text{ to } 2.0.$$

9. The resin composition according to claim 8, wherein the $^1$H-NMR spectrum satisfies a relationship of:

$$\frac{\text{Integral value of peaks at 4.75 to 4.69 ppm}}{\text{Integral value of peaks at 4.80 to 2.80 ppm}} \times 100 = 0.01 \text{ to } 1.0$$

or $$\frac{\text{Integral value of peaks at 4.59 to 4.55 ppm}}{\text{Integral value of peaks at 4.80 to 2.80 ppm}} \times 100 = 0.01 \text{ to } 1.0.$$

10. The resin composition according to claim 8, wherein the $^1$H-NMR spectrum satisfies a relationship of:

$$\frac{\text{Integral value of peaks at 4.69 to 4.59 ppm}}{\text{Integral value of peaks at 4.80 to 2.80 ppm}} \times 100 = 0.05 \text{ to } 1.0.$$

11. The resin composition according to claim 1, wherein every X in formulas (1), (A), and (B) is ethylene.

12. The resin composition according to claim 1, wherein every n in formulas (1), (A), and (B) is 1.

13. The resin composition according to claim 1, wherein the compound represented by formula (1) is 9,9-bis(4-(2-hydroxyethoxy)phenyl)fluorene or 9,9-bis(4-(2-hydroxyethoxy)-3-phenylphenyl)fluorene.

14. The resin composition according to claim 8, wherein every Z in formulas (3), (C), and (D) is ethylene.

15. The resin composition according to claim 8, wherein every m in formulas (3), (C), and (D) is 1.

16. The resin composition according to claim 8, wherein the compound represented by formula (3) is 2,2'-bis(2-hydroxyethoxy)-1,1'-binaphthalene.

17. The resin composition according to claim 1, wherein the resin is selected from the group consisting of a polycarbonate resin, a polyester resin, and a polyester carbonate resin.

18. The resin composition according to claim 17, wherein the resin is a polycarbonate resin.

19. An optical lens comprising the resin composition according to claim 1.

20. A sheet or a film comprising the resin composition according to claim 1.

* * * * *